US005671138A

United States Patent [19]
Bessacini et al.

[11] Patent Number: 5,671,138
[45] Date of Patent: Sep. 23, 1997

[54] FUZZY CONTROLLER FOR ACOUSTIC VEHICLE TARGET INTERCEPT GUIDANCE

[75] Inventors: Anthony F. Bessacini, Narragansett; Robert F. Pinkos, Saunderstown, both of R.I.

[73] Assignee: The United States of America as represented by the Secretary of the Navy, Washington, D.C.

[21] Appl. No.: 498,810

[22] Filed: Jul. 6, 1995

[51] Int. Cl.$^6$ ............................................. G06F 165/00
[52] U.S. Cl. ........................... 364/424.032; 364/423.098; 395/905; 244/3.13; 244/3.15
[58] Field of Search ............... 364/423.098, 424.027, 364/424.032, 462, 516; 395/3, 900, 905; 318/589; 244/3.1, 3.11, 3.13, 3.14, 3.15, 3.19

[56] References Cited

U.S. PATENT DOCUMENTS

| | | | |
|---|---|---|---|
| 4,732,349 | 3/1988 | Maurer | 244/3.13 |
| 5,080,300 | 1/1992 | Stubbs et al. | 244/3.14 |
| 5,101,351 | 3/1992 | Hattori | 395/905 |
| 5,118,050 | 6/1992 | Arnold et al. | 244/3.19 |
| 5,319,556 | 6/1994 | Bessacini | 364/424.02 |
| 5,429,322 | 7/1995 | Waymeyer | 244/3.15 |
| 5,436,832 | 7/1995 | Bessacini et al. | 364/424.02 |

*Primary Examiner*—Gary Chin
*Attorney, Agent, or Firm*—Michael J. McGowan; Prithvi C. Lall; Michael F. Oglo

[57] ABSTRACT

A target intercept guidance system for directing a steerable object, such as a torpedo with an acoustic homing device. The guidance system senses the bearing and range between a first site and a second site and determines the position of a guidance point for the steerable object as it moves toward the second site. Two error functions are produced. The first error function represents the angle between the bearing from the guidance point of the steerable object to the second site and the course of the steerable object. The second error signal represents an estimate of the rate of change of that angle. These error signals are classified into first and second sensed linguistic variables based upon membership functions from the first and second sensed variable membership function sets to become fuzzy inputs that produce fuzzy outputs comprised of control output linguistic variables and corresponding control output membership functions from a control output membership function set based upon logical manipulation of the fuzzy inputs. These fuzzy control output membership functions are converted into an output having an appropriate form for control after being conditioned in response to other information including the relative positions of the guidance point of the steerable object and the second site.

11 Claims, 17 Drawing Sheets

|  | $\Delta e_{gp}$ | | | | | | |
|---|---|---|---|---|---|---|---|
|  | NL | NM | NS | ZE | PS | PM | PL |
| N | PL | PM | PS | ZE | NS | NM | NL |
| $e_{gp}$ ZE | PL | PM | PS | ZE | NS | NM | NL |
| P | NL | NM | NS | ZE | PS | PM | PL |

FIG. 6

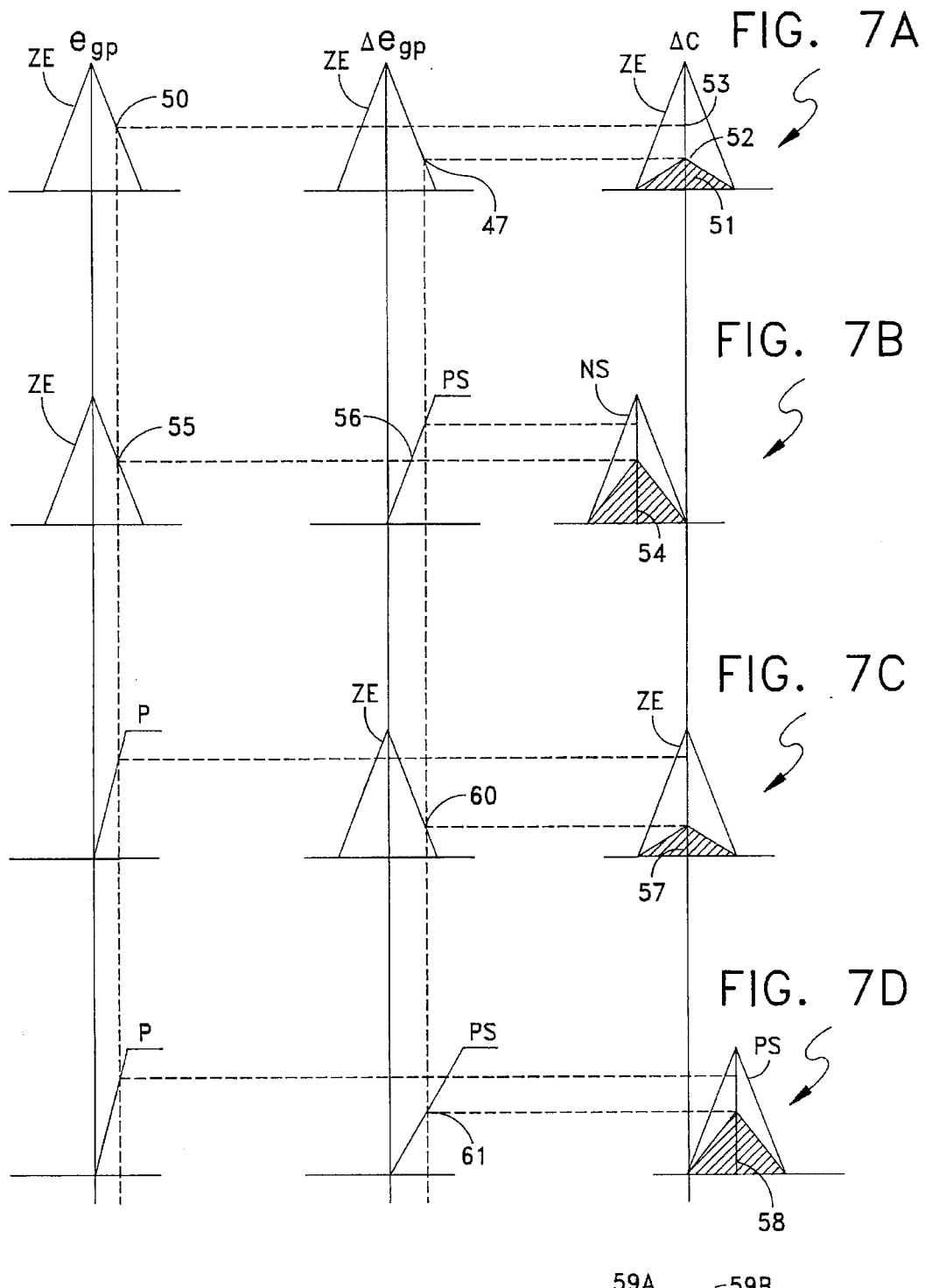
FIG. 7A
FIG. 7B
FIG. 7C
FIG. 7D
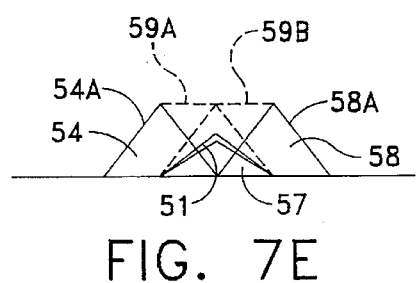
FIG. 7E

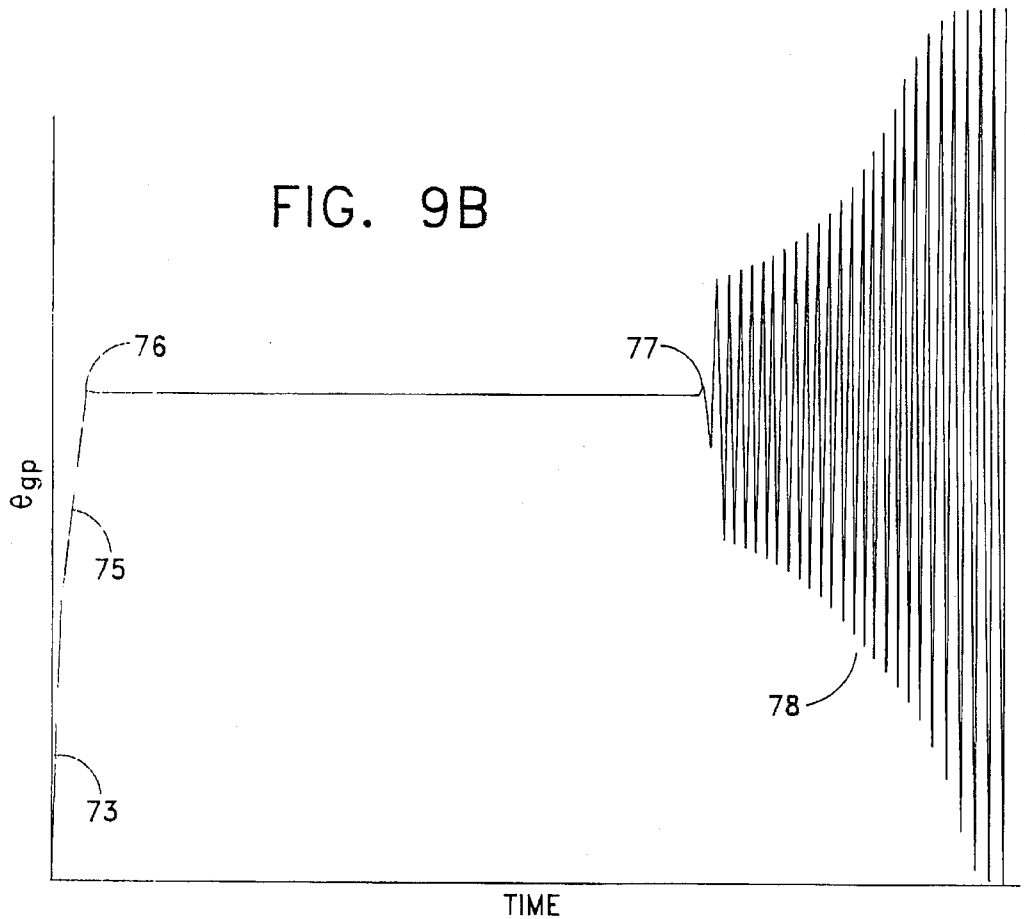
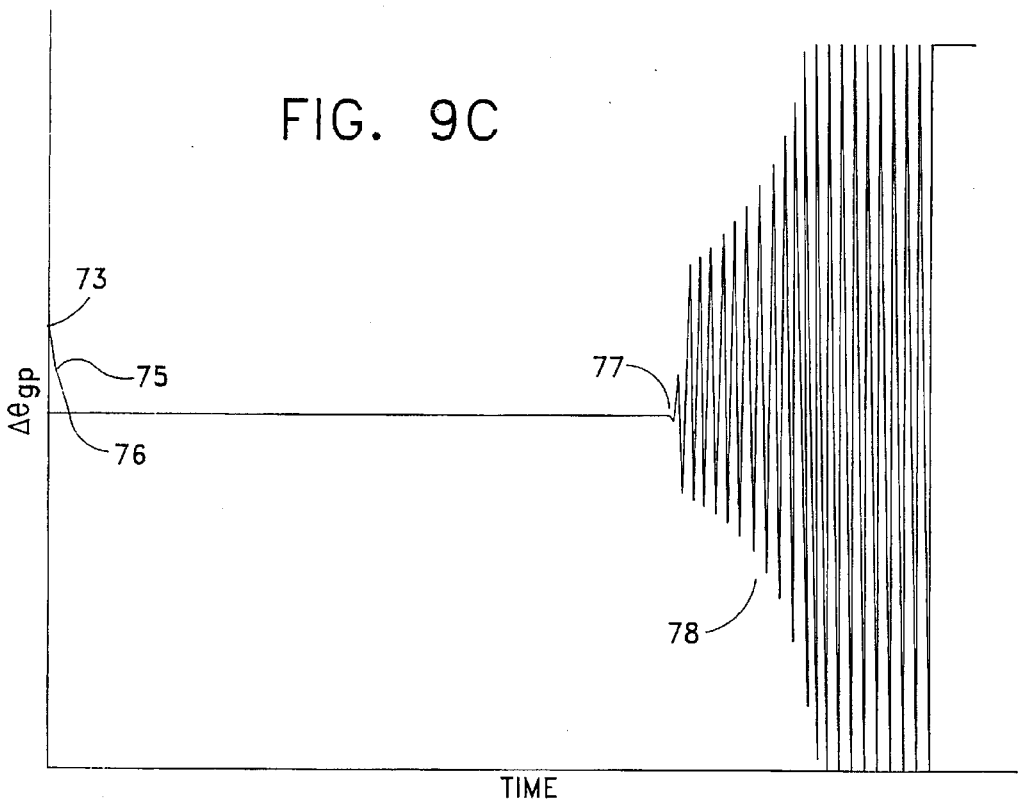

FUZZY CONTROLLER FOR ACOUSTIC VEHICLE TARGET INTERCEPT GUIDANCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

This invention generally relates to a control system located at a first site for guiding a steerable object from that site toward a second site. More specifically this invention relates to such a control system that is operable even when both the first and second sites undergo independent motion to steer an object with acoustic homing to a target intercept.

(2) Description of the Prior Art

Submarines include a control system for guiding an acoustic homing torpedo launched from the submarine toward a target. In this particular application, the torpedo constitutes a steerable object while the submarine and target constitute first and second sites, respectively, that are capable of undergoing independent motion. The control system that has been used in submarine applications is oftentimes a post launch intercept control system at the submarine, or first site, that guides a torpedo toward the target, as the second site, on an intercept trajectory to the second site.

Acoustic intercept control systems generally operate with steerable objects characterized by some internal homing or equivalent steering control system. In the case of a submarine launched torpedo, the intercept control system directs a torpedo with an acoustic homing system toward the target. When the torpedo comes within the effective range of the homing system, the homing system takes over the steering control function. Some steerable objects with such homing systems are also characterized by an external point in front of the steerable object called a "guidance point". This guidance point corresponds to the centroid of the acoustic beam in the case of a torpedo with an acoustic homing device. Generally an acoustic intercept control system operates to maintain the guidance point of a steerable object, such as a torpedo, on an intercept trajectory from the first site to the second site.

Prior art intercept control systems for submarine launched torpedoes include a control mechanism, a torpedo model and a communications link to the torpedo, as the steerable object. The torpedo model is a mathematical replica of the torpedo that provides position and status information for post launch guidance operation. The control mechanism utilizes measured contact information and torpedo model information to generate a command sequence for maintaining the guidance point on an intercept trajectory to the target. These commands are transferred from the submarine to the torpedo through a wire communications link.

Whereas prior art intercept control systems required a complete target state vector, the system disclosed herein operates with only measured range and bearing. These prior art intercept control systems require a complete target state vector and have not included any mechanism for readily allowing the inclusion of heuristic information into the control system, particularly information about expertise gained through past experience with manual intercept guidance systems. Also the prior art intercept control systems normally require an operator to determine whether to issue a particular command to a torpedo. Present systems do not automatically generate and issue guidance commands in a continuous fashion.

Other approaches for directing a steerable object from a launch site to a target involve complicated control systems based on sets of differential equations and estimates of input parameters. Such systems operate in response to analytical controllers. However, like prior art intercept control systems such analytical controllers are not readily adapted to utilize expert knowledge gained through experience.

In recent years another approach to controlling the operation of various devices has evolved. This approach now is generally known as fuzzy control. In broad terms, and as described in U.S. Pat. No. 4,860,213 to Bonissone, an automated rule-based reasoning with uncertainty system has a three layer structure composed of representation, inference and control layers. Rule firings and conclusions are computed in the inference layer in a manner to propagate uncertainty information through the system in accordance with predetermined formulas designated by the control layer. Rule structures and conclusions and uncertainty information associated therewith are represented to the user in the representation layer.

U.S. Pat. No. 5,101,351 to Hattori depicts one such fuzzy control system for steering a vehicle. In this system a camera forms an image of the road. An image processor uses the image to calculate the deviation between a plurality of reference points on a road and the direction in which the vehicle is traveling. Each reference point is associated with a plurality of visual points spaced along the road at predetermined distances ahead of the vehicle. The control determines the product of the deviation for each visual point and a membership function indicating the degree of importance attached to each visual point. The membership functions are varied in accordance with the time rate of change of the deviations. The control also calculates a total deviation equal to the sum of the products, and this total deviation is the basis for steering control.

U.S. Pat. No. 5,122,957 to Hattori discloses an autonomous vehicle for automatically and autonomously running on route of travel under a fuzzy controller. The fuzzy controller operates by using a plurality of control rules defining predetermined steering controlled variables according to magnitude classifications of previously classified deviations on steering operations and membership functions indicating certainties corresponding to respective classifications of actual deviations (offset), the certainties corresponding to each magnitude classification are correlated to the control rules to determine the steering controlled variable. In the autonomously running vehicle, the vehicle's running scenes are automatically detected on the basis of the image data derived by an image processing unit. Reference membership functions are varied according to any one of the running scenes so that the membership functions are automatically set according to the running scenes. Control rules are previously set only to the reference membership functions. Hence, setting operations of control rules and membership functions through simulations may be carried out only for the reference membership functions.

U.S. Pat. No. 5,189,619 to Adachi et al. discloses a system for controlling the speed of a vehicle in accordance with the driving characteristics of the driver. In effecting the follow-up driving which corresponds to the driving characteristics of the driver, the vehicle and the vehicle in front, the relative speed, the relative position and the running state such as the speed and the steering angle of the vehicle itself are detected. A danger index is calculated from the detected vehicle's environment and running state in accordance with the driver's sense of driving. The danger index is calculated by the fuzzy induction from the membership functions which are determined in advance in accordance with a general driver's sense of driving. The running state of the vehicle such as the speed is controlled in accordance with the danger index. When the manipulated variable is changed by the driving operation of the driver, the danger index is adjusted in accordance with the amount of change. The change by the driving operation of the driver is reflected as the change in the membership functions. Thus, the calculated danger index gradually agrees with the driving characteristics of the driver.

U.S. Pat. No. 5,218,542 to Endo et al. discloses a control system for an unmanned carrier vehicle that is capable of automatically and independently traveling along a guiding line laid on a floor and includes a steering angle control unit and/or velocity control unit. When the unmanned carrier vehicle is deviated from the guiding line, its deviation is detected by performing a time-differentiation on the deviation to determine the direction of the unmanned carrier vehicle in response to a signal from a sensor provided at a wheel of the unmanned carrier vehicle. Based on a result of a fuzzy inference performed on the deviation, deviation direction and steering angle, the steering angle control unit controls the steering angle of the unmanned carrier vehicle. Similarly, the velocity control unit controls a traveling velocity of the unmanned carrier vehicle. The fuzzy inference is performed in accordance with the predetermined control regulation.

U.S. Pat. No. 5,231,482 to Sieber et al. discloses a smart tracking system that includes a digital processor for selectively processing error signals representing the angular error between a tracked subject and the orientation of a tracking device/camera. In one embodiment, a user selects a set of data values representing the operating parameters of the system in a specific operational mode. The processor uses the selected variable to perform a series of computations which selectively modify the angular error signals in a manner that will produce a video picture which is visually and aesthetically pleasing to human viewers. In a second embodiment, the set of data values characterizing the operational mode of the system automatically is selected by the processor based on the past history of the subject's motion and the current operation mode of the system.

U.S. Pat. No. 5,280,565 to Nomoto et al. discloses a fuzzy backward reasoning device adapted for recognition applications. The device is capable of performing a computation to update reasoning every time a feature quantity is observed and of performing the reasoning even if the order of observations is arbitrary; this is accomplished by performing sequential reasoning, instead of batch type reasoning and by feeding back a reasoned result. A target recognition device is capable of computing, as a numerical value, the reliability of a recognized result on a target by obtaining other recognition information even if there is no other information concerning the target, using the sequential type fuzzy backward reasoning device.

U.S. Pat. No. 5,285,380 to Payton discloses a system for obtaining collective decisions from multiple control sources. The system is able to produce a single command from these control sources. Each control source corresponds to a behavior and each responds to inputs to produce a command. The system employs a piece-wise constant preference profile composed of zones, spikes and clamps which compress the amount of data required to process behavior preferences. The system sorts commands according to command values in a chart to produce a total profile which represents the combination of profiles of the command values for multiple behaviors. The peak zone in the total profile is then used to produce a desired response to the multiple commands. The system allows behaviors to be combined through the command fusion rather than subsumption. The piece-wise constant representation allows behavior commands to be combined after they have been passed through a standard control system. This permits behaviors to use any derivative of the control source's variable that is appropriate for their function. The system has bounded arbitration time so that control loop stability will not be disrupted by the arbitration process. The system also incorporates a method for smoothing behavior switching transients.

Several features of the control systems disclosed in the foregoing patents are antithetical in applications such as submarine launched torpedo guidance applications. Each control system disclosed in the patents is located on a vehicle used as a steerable object; in a submarine application, the control system must be located on the submarine remotely from the torpedo as a steerable object. Moreover in a submarine application, both the submarine and target usually undergo motion relative to each other and relative to the torpedo. The systems disclosed in some of the patents monitor only a fixed line so the system only needs to respond to deviations in the direction of vehicle travel relative to the reference line. Finally, many of the fuzzy control systems select control rules on the basis of one set of related parameters, namely deviation and a derived rate of change of deviation that is modified by vehicle speed. Such a system uses a single set of control rules derived from a single input; in a submarine application the system control rules are derived from two inputs representing the state of the steerable object or vehicle and the target and the state of the steerable object or vehicle involves characteristics of the vehicle and its guidance point. Consequently systems based upon the above-identified prior art patents will not work well in a submarine environment particularly with acoustic torpedoes.

SUMMARY OF THE INVENTION

Therefore it is an object of this invention to provide an improved target intercept guidance system at a first site for guiding an object as it moves from the first site toward a second site.

Another object of this invention is to provide a target intercept guidance system using fuzzy control that operates from a first site for guiding an object from the first site toward a second site wherein both the first site and second site can undergo independent motion.

Still another object of this invention is to provide a target intercept guidance system including fuzzy control for steering a torpedo with an acoustic homing device from a submarine toward a target.

Yet still another object of this invention is to provide a target intercept guidance system with fuzzy control for use with submarine launched torpedoes with guidance points that can be adapted for use in a variety of situations.

Still yet another object of this invention is to provide a target intercept guidance system for submarine launched torpedoes with guidance points that can operate automatically and can readily accommodate diverse operating circumstances.

Yet another object of this invention is to provide a target intercept guidance system with fuzzy control that is capable of operating in response to inputs limited to bearing and range.

In accordance with this invention, a target intercept guidance system located at a first site communicates with a steerable object over a communications link and guides the steerable object from the first site toward a second site. The guidance system operates iteratively and during each iteration determines a relative bearing from the guidance point of the steerable object to the second site and the rate of change of that bearing. A fuzzy control system utilizes these bearings and the rate of change of the bearings to generate a guidance command. This guidance command is further conditioned as a function of the position of the steerable object relative to the first and second sites. The communications link transfers the conditioned guidance command to direct the steerable object according to a set of logical guidance rules as modified by conditioning and to cause the guidance point of the steerable object to intercept the second site along its course.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 6 depicts a rule based matrix incorporated in the rule based unit of FIG. 5;

FIG. 7 includes Graphs 7A through 7E that depict the operation of the rule based unit shown in FIGS. 2 and 5;

FIGS. 9A, 9B and 9C depict the operation of the guidance system shown in FIG. 2 absent the command conditioning unit of FIG. 8 when a target does not maneuver;

DESCRIPTION OF THE PREFERRED EMBODIMENT

Figure 1:
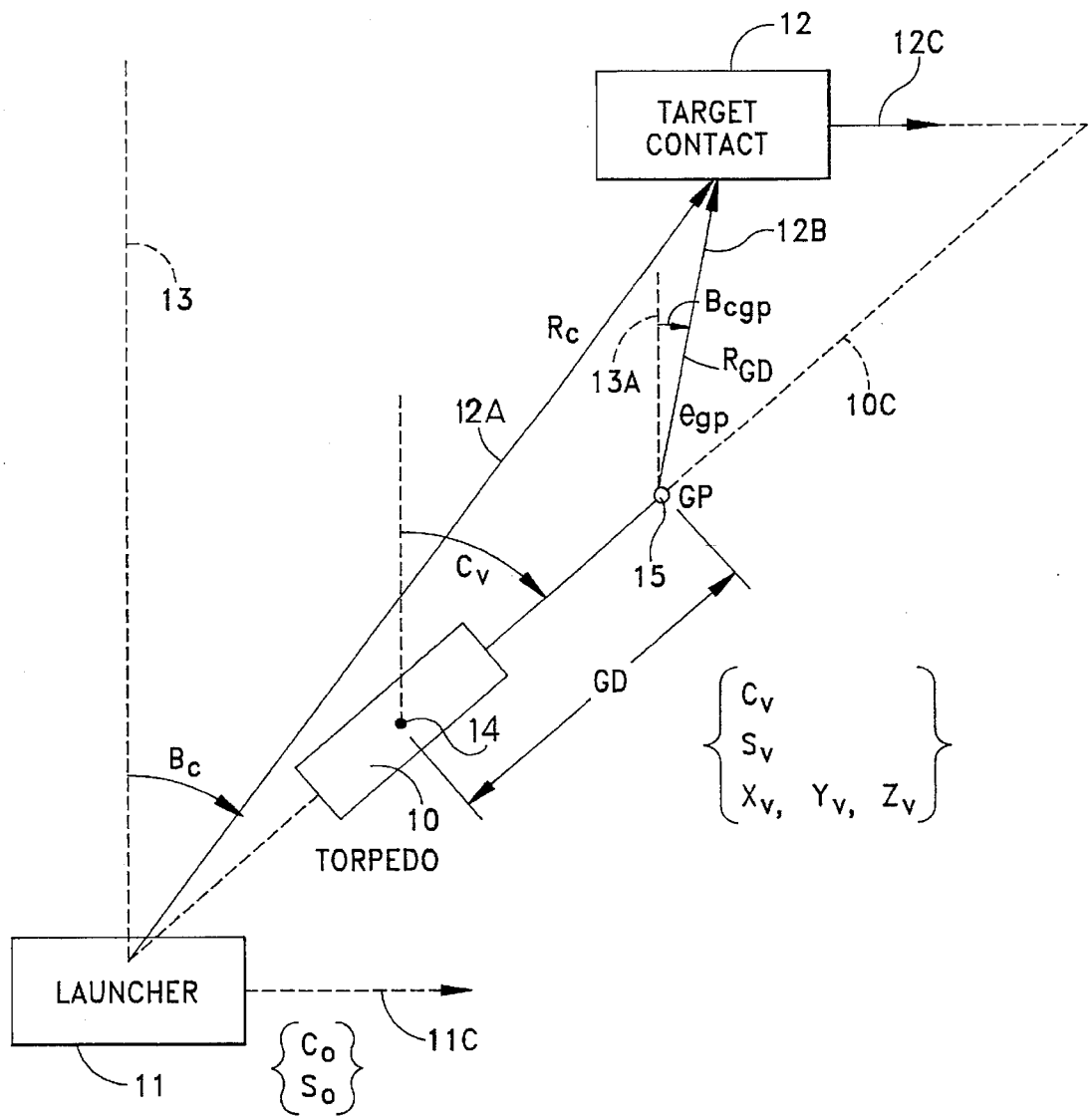
FIG. 1 depicts various relationships among a first site, a second site and a steerable object that are useful in understanding this invention.

FIG. 1 depicts an acoustic homing torpedo 10, as an example of a steerable object with an internal acoustic homing device, that is moving from a first site, shown as a launcher 11, toward a second site, shown as a target or contact 12. The torpedo 10 has a position ($X_v$, $Y_v$ and $Z_v$), a course ($C_v$) and a speed ($S_v$). The launcher 11 is moving along a course $C_o$ and at speed $S_o$ as represented by an arrow 11C while the target is moving along an arbitrary course at an arbitrary speed, both of which are unknown and represented by an arrow 12C. Each of these course lines 11C and 12C are normally measured with respect to some reference shown by a dashed line 13 in FIG. 1, typically magnetic north. In this embodiment the guidance system uses measurements to a center point 14 that represents the center of the torpedo 10 and a guidance point (GP) 15 that corresponds to the centroid of the acoustic beam of the internal acoustic homing device. The torpedo 10 moves along a course line 10C having a course $C_v$.

Figure 2:
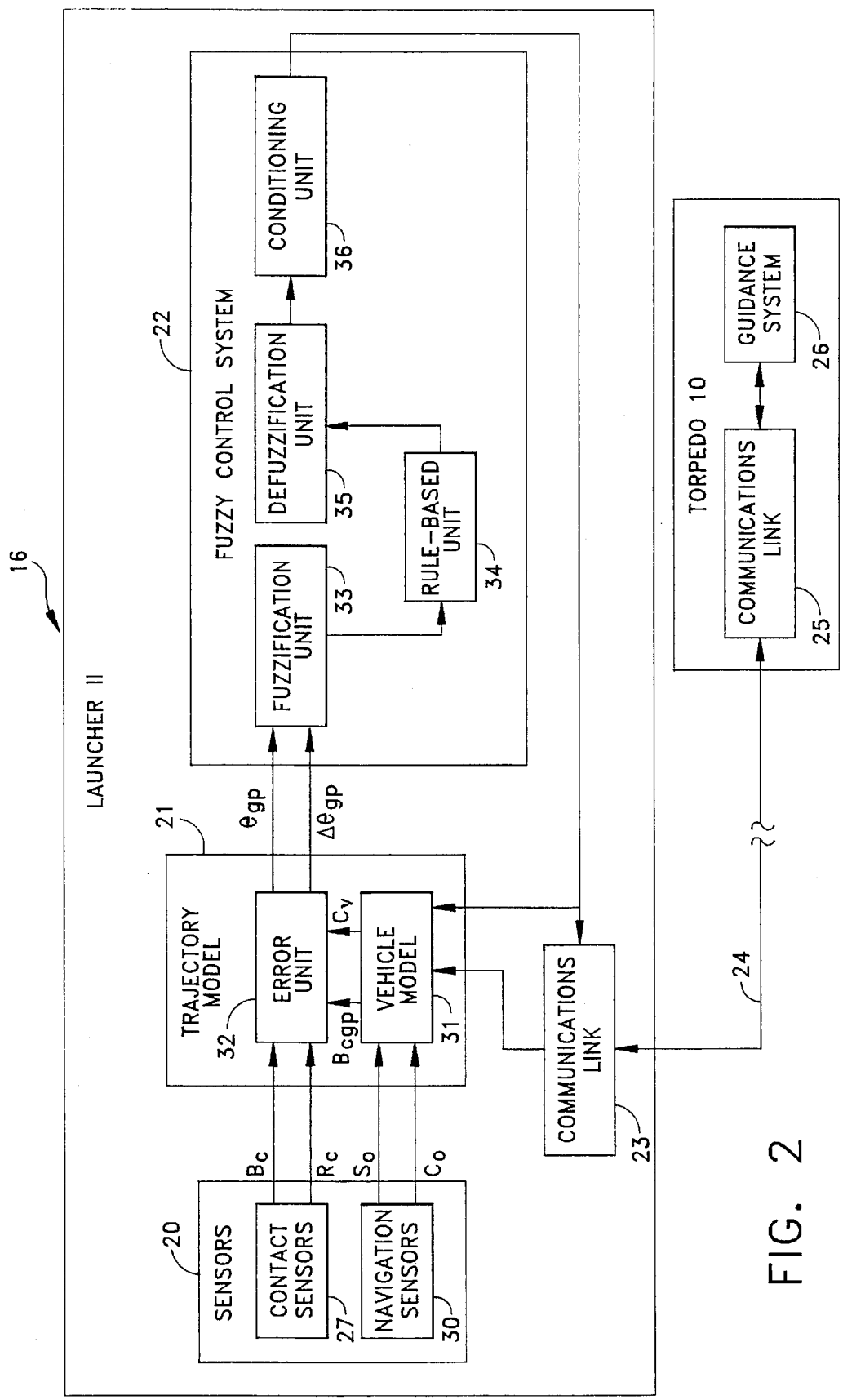
FIG. 2 is a block diagram of a target intercept guidance system constructed and operated in accordance with this invention.

Referring now to FIG. 2, a guidance system 16 constructed in accordance with this invention includes sensors 20 that measure various parameters associated with the target 12 and the launcher 11. A trajectory model 21 processes data from the sensors 20 and generates a set of error functions (first and second sensed variables) for a fuzzy control system 22 that classifies each of the error functions into one or more sensed linguistic variables from a corresponding set of predetermined sensed linguistic variables based upon their associated sensed variable membership functions. This control system 22 logically combines the selected ones of the first and second sensed linguistic variables for identifying one or more control output linguistic variables and corresponding control output membership functions from a control output membership function set. The control system 22 also converts the selected control output membership function or functions into a guidance command.

A communications link 23 transfers the guidance command over a bidirectional communications channel 24, typically formed by a wire connected to the torpedo 10, to another communications link 25 and a guidance system 26 in the torpedo 10. Information from the torpedo 10 also transfers through the communications link 23 to the trajectory model 21.

Figure 3A:
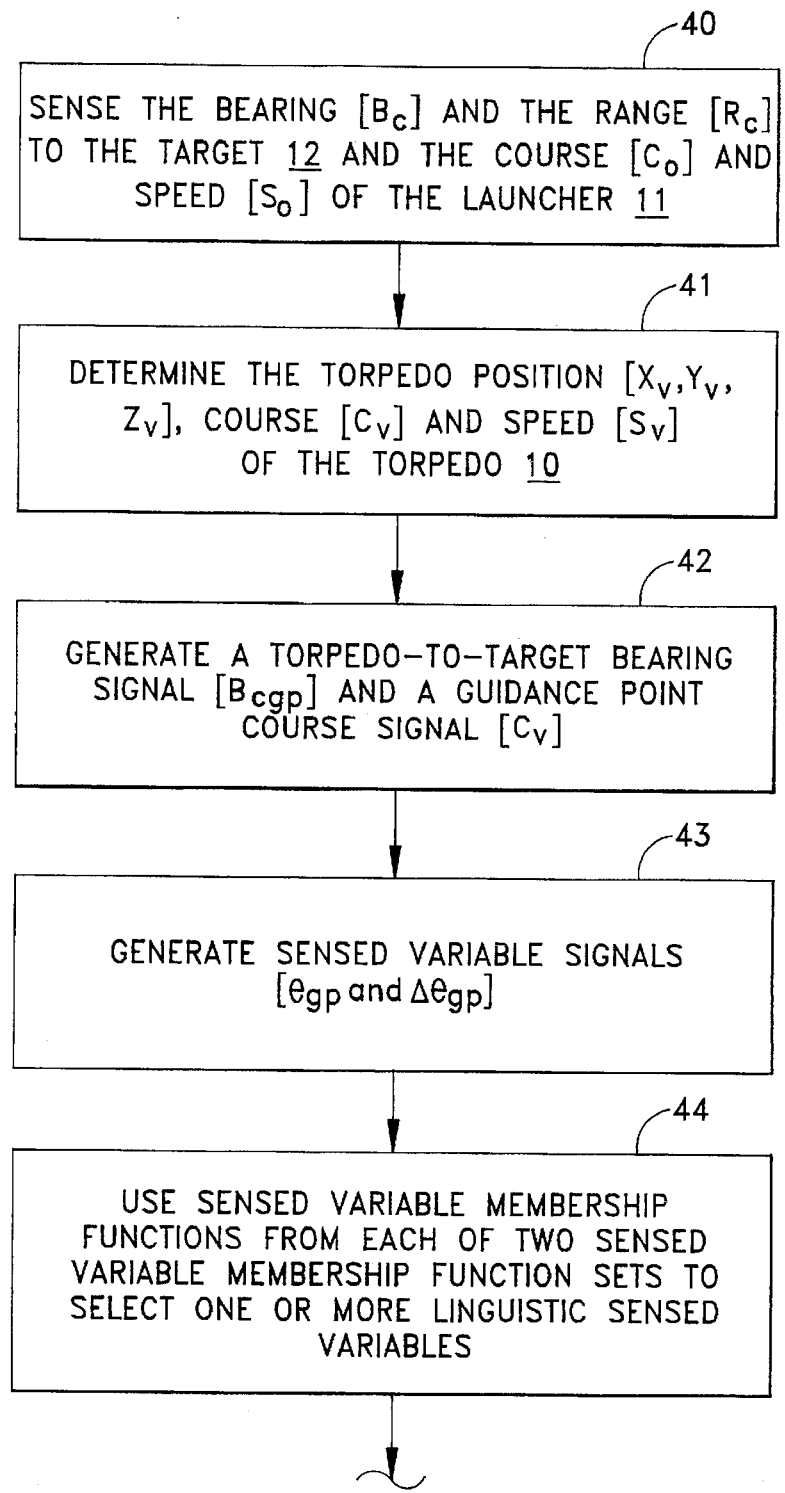
FIGS. 3A and 3B constitute a flow diagram that depicts the operation of the guidance system in FIG. 2.

Referring to FIGS. 1 and 2, the sensors 20 include contact sensors 27 that produce a bearing, $B_c$, defined by the angle between the reference 13 and a line 12A to the target 12 and a range, $R_c$, to the target 12 along the line 12A. Navigation sensors 30 of FIG. 2 simultaneously define the course $C_o$ and speed $S_o$ of the launcher 11. As shown in FIG. 3A, this activity occurs during step 40 that is the first step in an iterative process disclosed by the remaining steps in FIGS. 3A and 3B. That is, FIGS. 3A and 3B define each step that occurs during each iteration.

In step 41 (FIG. 3A) a vehicle model 31 (FIG. 2) provides the position ($X_v$, $Y_v$ and $Z_v$), course ($C_v$) and speed ($S_v$) of the torpedo 10. This information can be obtained utilizing information supplied by the navigation sensors 30 and open loop or dead reckoning updates to the vehicle model 31 or supplemented with information from the torpedo 10.

Whatever the inputs, the vehicle model 31 produces two signals for an error unit 32. One is a $B_{cgp}$ signal that represents the bearing defined by the angle between a reference line 13A parallel to the reference line 13 in FIG. 1 and a line 12B from the guidance point 15 of torpedo 10 to the target 12 that represents the bearing between the target 12 and the guidance point 15 of the torpedo 10. The second is the $C_v$ signal that represents the course of the torpedo 10 along the line 10C. This occurs during step 42 in FIG. 3A.

In the guidance system 16, the error unit 32 produces an $e_{gp}$ error signal as a first sensed variable corresponding to the instantaneous difference between the bearing from the guidance point 15 of torpedo 10 to the target 12 (i.e., $B_{cgp}$) and the course of the torpedo 10 (i.e., $C_v$). The error unit 32 also produces an $\Delta e_{gp}$ error signal that represents a second sensed variable corresponding to the rate of change of the $e_{gp}$ error signal. The error unit 32 uses the error signal, $e_{gp}$ and the bearing, $B_{cgp}$ and the course, $C_v$ to develop this rate of change error signal. If the guidance system 16 in FIG. 2 repeats the operation once per second, the difference between $|e_{gp(k)}|$ and $|B_{cgp(k-1)}-C_{v(k)}|$ determines the rate at which the error $e_{gp}$ changes in degrees per second.

More specifically, during step 43 of each iteration of FIG. 3A the error unit 32 in FIG. 2 converts the incoming signals into error and error rate signals representing the sensed variables as follows:

$$e_{gp} = B_{gp} - C_v \tag{1}$$

and $$\Delta e_{gp} = |B_{cgp} - C_v|_k - |B_{cgp(k-1)} C_{v(k)}| \tag{2}$$

Figure 4A:
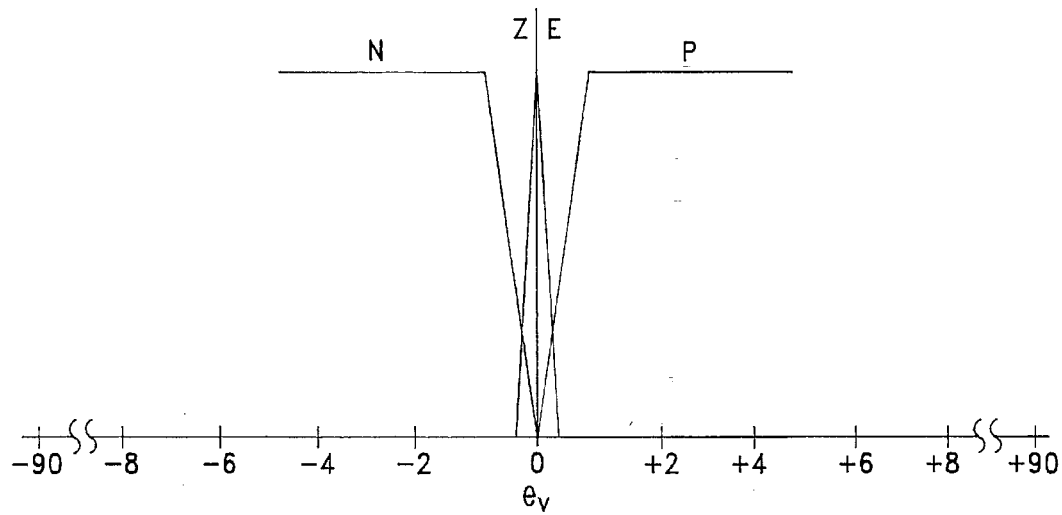
FIGS. 4A, 4B and 4C are graphical representations of linguistic variables and their associated membership function sets that are useful understanding in this invention.

Step 44 in FIG. 3A represents a procedure by which the control system 22 of FIG. 2 encodes each of the error signals representing the sensed variables into one or more corresponding sensed linguistic variables based upon sensed variable membership functions from corresponding sensed variable membership function sets. FIG. 4A, for example, discloses an $e_{gp}$ sensed variable membership function set with three sensed variable membership functions and their corresponding sensed $e_{gp}$, or "error" linguistic variables that provides an indication of the sign of the $e_{gp}$ sensed variable while FIG. 4B discloses an $\Delta e_{gp}$ sensed variable membership function set with seven $\Delta e_{gp}$ sensed variable membership functions and their corresponding sensed $\Delta e_{gp}$, or "error rate" linguistic variables.

Assuming that the following relationships exist $$x1 = e_{gp} \tag{3}$$

and $$x2 = \Delta e_{gp} \tag{4}$$

a fuzzification unit 33 in FIG. 2 uses the $e_{gp}$ signals to select one or more of three available $e_{gp}$ sensed error linguistic variables and the $\Delta e_{gp}$ signal to select one or more of seven available $\Delta e_{gp}$ sensed error rate linguistic variables. The possibilities in this particular embodiment, that includes the "error" and "error rate" linguistic variables T(x1) and T(x2) respectively, can be designated as:

$$T(x1) = (T^1_{x1}, T^2_{x1}, T^3_{x1}) \tag{5}$$
$$= (N, ZE, P)$$

and $$T(x2) = T^1_{x2}, T^2_{x2}, T^3_{x2}, T^4_{x2}, T^5_{x2}, T^6_{x2}, T^7_{x2} \tag{6}$$
$$= (NL, NM, NS, ZE, PS, PM, PL)$$

where "NL" denotes a Negative Large sensed linguistic variable; "NS", a Negative Small sensed linguistic variable; "NM", a Negative Medium sensed linguistic variable; "N", a negative sensed linguistic variable; "ZE", a Zero sensed linguistic variable; "PS", a Positive Small sensed linguistic variable; "PM", a Positive Medium sensed linguistic variable; "PL", a Positive Large sensed linguistic variable; and "P", a positive sensed linguistic variable.

Figure 4B:
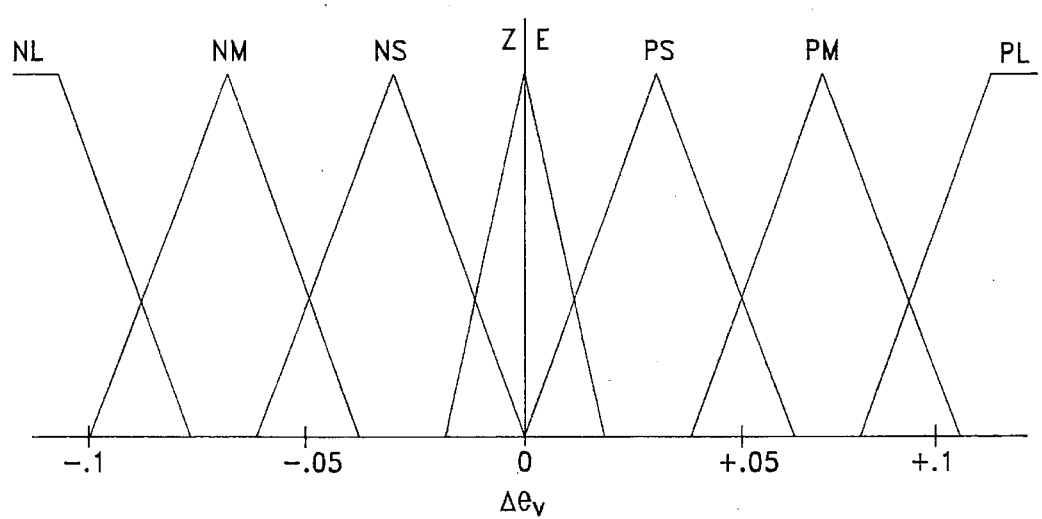

The specific set of membership functions μ(x1) and μ(x2) corresponding to inputs x1 and x2 and the sensed bearing error and error rate linguistic variables as shown in FIGS. 4A and 4B, can be mathematically stated as follows:

$$\mu(x1) = (\mu^1_{x1}, \mu^2_{x1}, \mu^3_{x1}) \tag{7}$$

and $$\mu(X2) = (\mu^1_{x2}, \mu^2_{x2}, \mu^3_{x2}, \mu^4_{x2}, \mu^5_{x2}, \mu^6_{x2}, \mu^7_{x2}). \tag{8}$$

For j=1 and i=2 and for j=2 and i=2,3,4,5,6

$$\mu^i_{xj} = 1 - \frac{(|xj - C^i_{xj}|)}{\delta^i_{xj}} \tag{9}$$

for $$C^i_{xj} - \delta^i_{xj} \leq xj \leq C^i_{xj} + \delta^i_{xj} \tag{10}$$

and $$\mu^i_{xj} = 0 \tag{11}$$

for $$C^i_{xj} - \delta^i_{xj} \geq xj \geq C^i_{xj} + \delta^i_{xj} \tag{12}$$

The end conditions, j=1 and i=1,3 and j=2 and i=1, 7 are defined by the following equations:

$$\mu^i_{xj} = 1 - \frac{(|xj - C^i_{xj}|)}{\delta^i_{xj}} \tag{13}$$

for $$a^i C^i_{xj} \geq a^i xj \geq a^i (C^i_{xj} - a^i \delta^i_{xj}) \tag{14}$$

and $$\mu^i_{xj} = 1 \tag{15}$$

for $$a^i C^i_{xj} \leq a^i xj \tag{16}$$

and $$\mu^i_{xj} = 0 \tag{17}$$

for $$a^i (C^i_{xj} - a^i \delta^i_{xj}) \geq a^i xj \tag{18}$$

where $a^i = 1$, except for i=1 where $a^1 = -1$.

FIG. 4A depicts graphically the relationship of each sensed error linguistic variable and associated membership function in the $e_{gp}$ membership function set for different values of the $e_{gp}$ signal according to a specific set of values for $C^i_{xj}$ and $\delta^i_{xj}$. FIG. 4B presents analogous information for the $\Delta e_{gp}$ signal. In the specific embodiment shown in FIGS. 4A and 4B certain incoming signals correspond to a single or multiple sensed error and sensed error rate linguistic variables based upon corresponding membership functions. For example, in FIG. 4A the $e_{gp}$ membership function set is used to encode an $e_{gp}$ signal having a value 0 only into a ZE linguistic sensed error variable whereas a value of slightly less than 0 is encoded into both N and ZE sensed error linguistic variables. Likewise the error rate membership set in FIG. 4B is used to encode a signal $\Delta e_{gp}=0.05$ into PS and PM sensed error rate linguistic variables while a signal $\Delta e_{gp}=0$ is encoded only into a ZE sensed error rate linguistic variable.

Figure 3B:
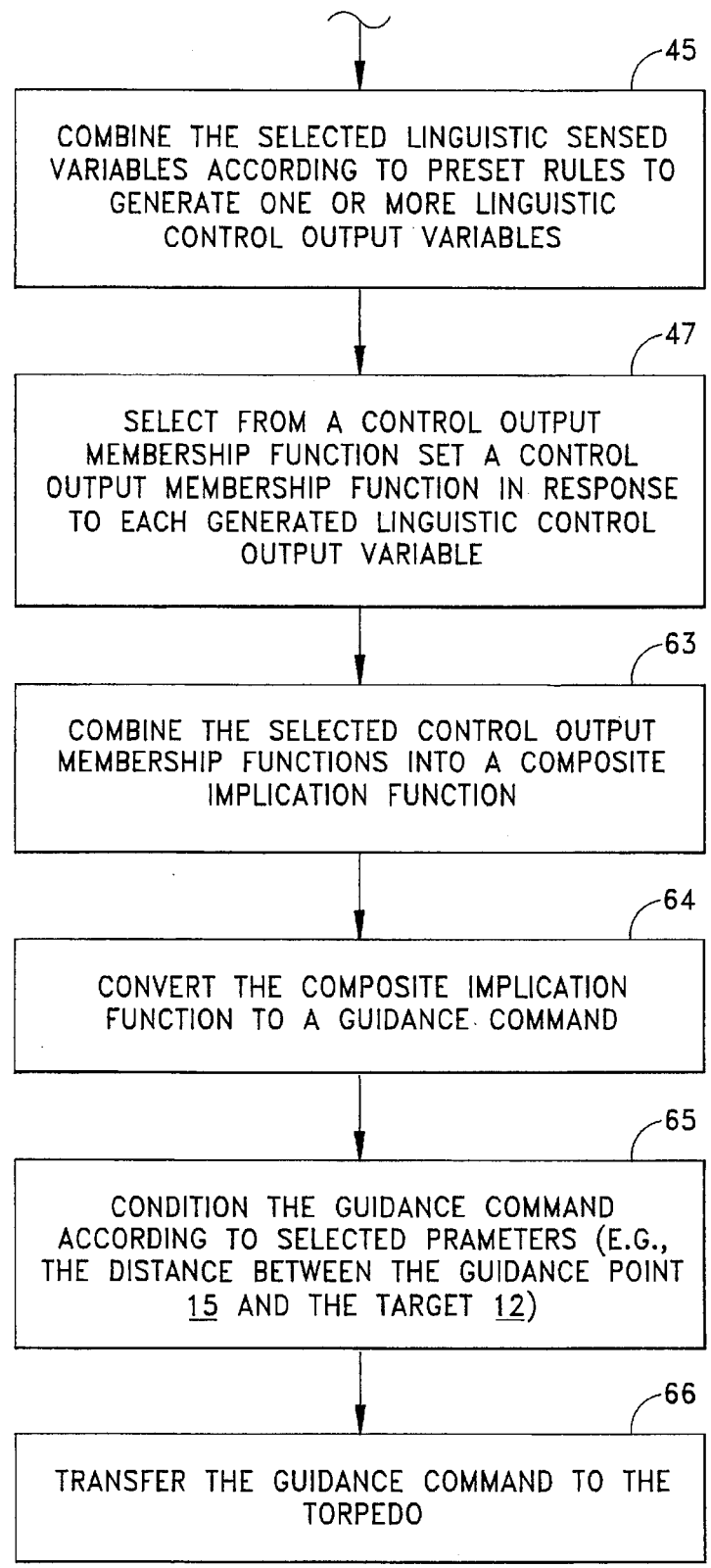
Figure 4C:
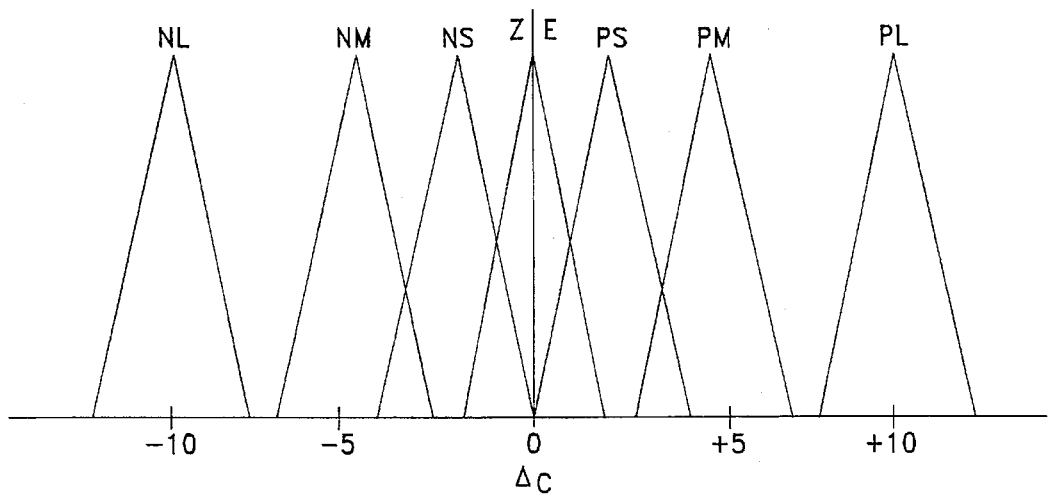
Figure 5:
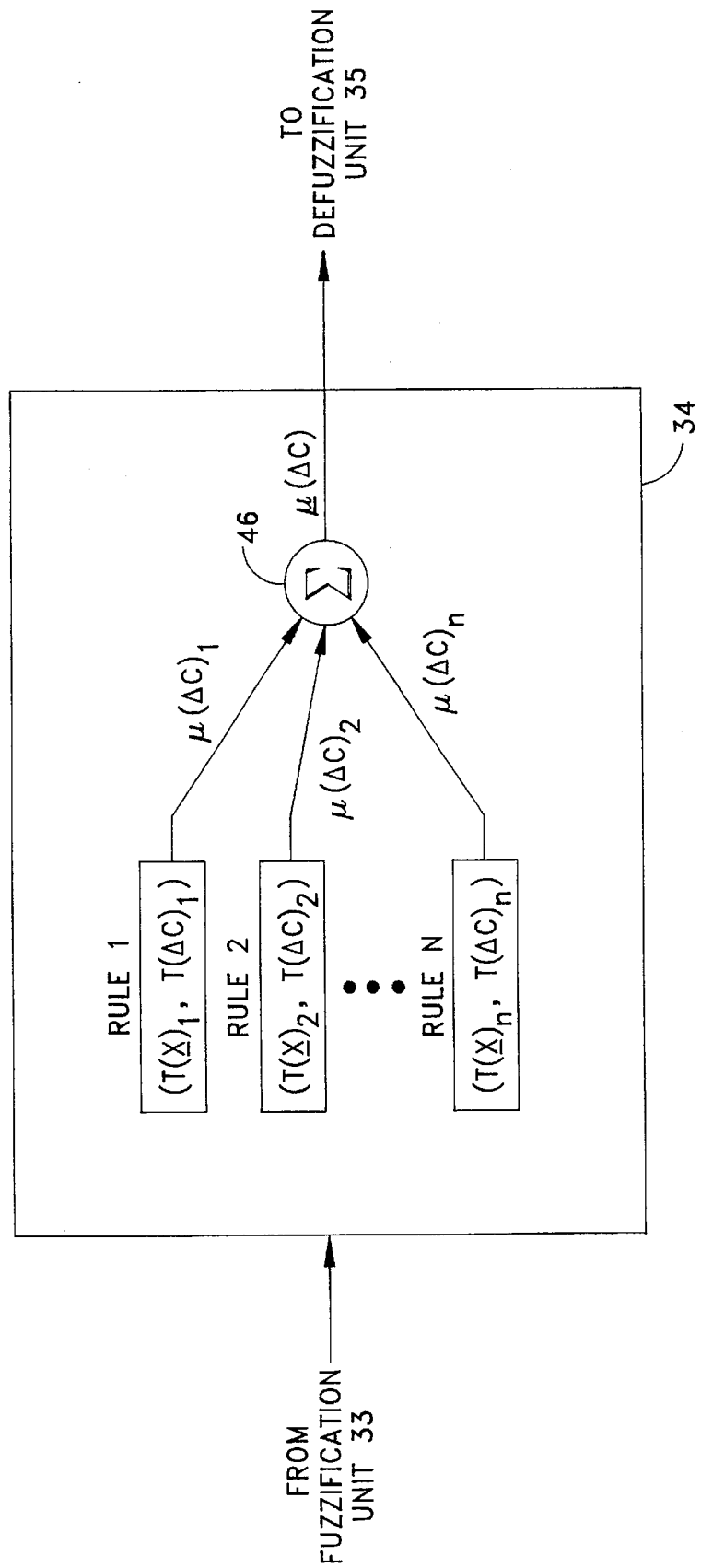
FIG. 5 schematically represents a rule based unit shown in FIG. 2.

Referring to step 45 in FIG. 3B, the rule based unit 34 in FIGS. 2 and 5 combines the selected sensed error and error rate linguistic variables to produce one or more control output linguistic variables. Each selected control output linguistic variable corresponds to a predefined membership function in a control output membership function set (FIG. 4C). More specifically, each control output linguistic variable is determined according to a predetermined set of logical rules defined in FIG. 6.

The control outputs include, in this specific embodiment, seven control output linguistic variables defined as:

$$T(\Delta C) = (T^1_{\Delta C}, T^2_{\Delta C}, T^3_{\Delta C}, T^4_{\Delta C}, T^5_{\Delta C}, T^6_{\Delta C}, T^7_{\Delta C}) \quad (19)$$
$$= (NL, NM, NS, ZE, PS, PM, PL)$$

and $$\mu(\Delta C) = \{\mu^1_{\Delta C}, \mu^2_{\Delta C}, \mu^3_{\Delta C}, \mu^4_{\Delta C}, \mu^5_{\Delta C}, \mu^6_{\Delta C}, \mu^7_{\Delta C}\}. \quad (20)$$

The corresponding control output membership functions are shown in FIG. 4C and can be defined, for i=1,2,3,4,5,6,7 by $$\mu^i_{\Delta C} = 1 - \frac{(|\Delta C - C^i_{\Delta C}|)}{\delta^i_{\Delta C}} \quad (21)$$

for $$C^i_{\Delta c} - \delta^i_{\Delta c} \geq \Delta C \geq C^i_{\Delta c} + \delta^i_{66 c} \quad (22)$$

and by $$\mu^i_{\Delta c} = 0 \quad (23)$$

for $$C^i_{\Delta c} - \delta^i_{\Delta c} \geq \Delta C \geq C^i_{\Delta c} + \delta^i_{\Delta c} \quad (24)$$

Values for the various constants $C^i$ and $\delta^i$ are associated with different membership functions of the sensed variable and control output variable membership function sets. If $\mu(x1)$ and $\mu(x2)$ represent the sensed variable membership function sets and $\mu(\Delta C)$ represents the control output membership function set, the following table provides some specific examples:

| i | $\mu(x1)$ | | $\mu(x2)$ | | $\mu(\Delta C)$ | |
|---|---|---|---|---|---|---|
| | $C^i_{x1}$ | $\delta^i_{x1}$ | $C^i_{x2}$ | $\delta^i_{x2}$ | $C^i_{\Delta C}$ | $\delta^i_{\Delta C}$ |
| 1 | −0.5 | 0.5 | −0.12 | 0.04 | −10.0 | 2.0 |
| 2 | 0.0 | 0.5 | −0.07 | 0.03 | −5.0 | 2.0 |
| 3 | 0.5 | 0.5 | −0.03 | 0.03 | −2.0 | 2.0 |
| 4 | | | 0.00 | 0.01 | 0.0 | 2.0 |
| 5 | | | 0.03 | 0.03 | 2.0 | 2.0 |
| 6 | | | 0.07 | 0.03 | 5.0 | 2.0 |
| 7 | | | 0.12 | 0.04 | 10.0 | 2.0 |

The rule base unit 34 of FIG. 2 operates according to a series of rules defined in terms of different combinations of the sensed error and error rate linguistic variables. For example, if the fuzzification unit classifies both the $e_{gp}$ signal as a Negative (N) sensed linguistic variable and $\Delta e_{gp}$ signal as a Negative Large (NL) sensed linguistic variable, the rule based unit 34 will generate a positive large (PL) control output linguistic variable. FIG. 6 depicts the control output linguistic variable membership rules in matrix form for all values.

The rule base unit 34 in FIG. 5 utilizes all the possible combinations for a given set of readings to produce an output based upon the selection of one or more control output membership functions. More specifically, if the $e_{gp}$ signal can be classified both as ZE and P sensed error linguistic variables based upon the x1 or $e_{gp}$ membership function set of FIG. 4A while the $\Delta e_{gp}$ signal is encoded into ZE and PS sensed error rate linguistic variables based upon the x2 or $\Delta e_{gp}$ membership function set of FIG. 4B, FIG. 6 discloses that the rule based unit 34 will correlate each of the possible four input combinations as follows:

IF $e_{gp}$ is ZE AND $\Delta e_{gp}$ is ZE THEN $\Delta C$ is ZE.
IF $e_{gp}$ is ZE AND $\Delta e_{gp}$ is PS THEN $\Delta C$ is NS.
IF $e_{gp}$ is P AND $\Delta e_{gp}$ is ZE THEN $\Delta C$ is ZE.
IF $e_{gp}$ is P AND $\Delta e_{gp}$ is PS THEN $\Delta C$ is PS.

Thus in step 45 the rule based unit 34 produces different output consequences or control output linguistic variables derived from these selected rules.

A summing circuit 46, symbolically referenced in FIG. 5, essentially combines each of the output variable membership functions corresponding to each of the selected control output linguistic variables to produce an output signal as shown by steps 47 and 63 in FIG. 3B. More specifically, the summing circuit 46 in FIG. 5 combines the selected control output membership functions scaled by the various sensed variable signals as illustrated in FIG. 7.

FIG. 7 depicts each of the four previously identified input combinations and correlations in Graphs 7A through 7D respectively. During the selection of the sensed linguistic variables, the fuzzification unit 33 correlates each of the sensed variable signals to a particular point on a corresponding encoding sensed variable membership function. This correlation provides scaling for each control output membership function through the selection of the lower of the intercepts of the input signals with the corresponding sensed variable membership functions incorporated in the specific rule.

For example, in the case of the first rule shown in Graph 7A, an intersection 47 of the $\Delta e_{gp}$ signal with ZE membership function is lower than the intersection 50 of the $e_{gp}$ signal with its selected ZE membership function, so the $\Delta e_{gp}$ signal controls the magnitude of the selected ZE control output membership function by establishing a scaled triangular output function 51 with its peak at intersection 52 rather than the intersection 53. In a similar fashion, the second rule depicted in Graph 7B produces a triangular form 54 based upon an intersection 56 of the $\Delta e_{gp}$ signal with the ZE sensed variable membership function that is lower than an intersection 56 of the $\Delta e_{gp}$ signal with its corresponding PS membership function. Similarly the rules depicted in Graphs 7C and 7D provide triangular forms 57 and 58 respectively based upon a lower intersection 60 of the $\Delta e_{gp}$ signal in FIG. 7C and upon a lower intersection 61 of the $\Delta e_{gp}$ signal in FIG. 7D.

Stated mathematically, the inferred control output functions from each of the identified rules are, respectively, (1) $\zeta_{(1)}\mu^4_{\Delta c}$, (2) $\zeta_{(2)}\mu^3_{\Delta c}$, (3) $\zeta_{(3)}\mu^4_{\Delta c}$ and (4) $\zeta_{(4)}\mu^5_{\Delta c}$ where:

$\zeta_{(1)}\mu^4_{\Delta c} = \mu(\Delta C)_{(1)}$ = the control output function for rule 1 defined by $\mu^4_{\Delta c}$ multiplied by the value $\zeta_{(1)}$; and $\zeta_{(2)}\mu^3_{\Delta c} = \mu(\Delta C)_{(2)}$ = the control output function for rule 2 defined by $\mu^3_{\Delta c}$ multiplied by the value $\zeta_{(2)}$.

$\zeta_{(3)}\mu^4_{\Delta c} = \mu(\Delta C)_{(3)}$ = the control output function for rule 3 defined by $\mu^4_{\Delta c}$ multiplied by the value $\zeta_{(3)}$; and $\zeta_{(4)}\mu^5_{\Delta c} = \mu(\Delta C)_{(4)}$ = the control output function for rule 4 defined by $\mu^5_{\Delta c}$ multiplied by the value $\zeta_{(4)}$;

and $$\zeta_{(1)} = Y^2_{x1} \wedge Y^4_{x2} = \min(Y^2_{x1}, Y^4_{x2}) \quad (25)$$

$$\zeta_{(2)} = Y^2_{x1} \wedge Y^5_{x2} = \min(Y^2_{x1}, Y^5_{x2}) \quad (26)$$

$$\zeta_{(3)} = Y^3_{x1} \wedge Y^4_{x2} = \min(Y^3_{x1}, Y^4_{x2}) \quad (27)$$

$$\zeta_{(4)} = Y^3_{x1} \Lambda Y^5_{x2} = \min(Y^3_{x1}, Y^5_{x2}) \qquad (28)$$

where $Y_{xj}^i$ is $\mu_{xj}^i$ evaluated at a specific sensed input $xj(t)$ at time "t" and where "$\Lambda$" denotes a fuzzy "and"/or minimum. The control output composite implication function, $\mu(\Delta C)$, of the rule-based unit for this example is expressed as:

$$\mu(\Delta C) = \mu(\Delta C)_{(1)} + \mu(\Delta C)_{(2)} + \mu(\Delta C)_{(3)} + \mu(\Delta C)_{(4)} \qquad (29)$$

As previously indicated, the ruled based unit 34 in FIGS. 2 and 5 also operates in accordance with step 63 of FIG. 3B by combining the scaled fuzzy output membership functions shown in FIG. 7 into a composite output function that is acceptable for use in the defuzzification unit 35. A number of methods can be utilized for converting composite outputs into guidance commands in step 64. The defuzzification unit 35 uses a centroid method to provide guidance commands. Mathematically the centroid is computed as follows:

$$\Delta C = \frac{\Sigma_k [(\zeta_{(k)} C_{\Delta C_{(k)}} I_{\Delta C_{(k)}}]}{\Sigma_k \zeta_{(k)} I_{\Delta C_{(k)}}} \qquad (30)$$

where $\Sigma_{(k)}$ is the summation over all the rules selected by the rule based unit 34 and $I_{\Delta c(k)}$ and $C_{\Delta c(k)}$ are the respective area and centroid of the kth rule consequent set membership function. This is represented in Graph 7E that depicts the superposition of the scaled control output membership functions of Graphs 7A through 7D. The resulting or composite output function is the sum of the selected control output functions shown in Graphs 7A through 7D. This composite function includes the area between dashed lines 59A and 59B plus the sides 54A and 58B of the functions 54 and 58, respectively, from the dashed lines 59A and 59B. The defuzzification unit 35 calculates the centroid for the function shown in FIG. 7E to produce a resulting $\Delta C$ signal that is the finite signal for controlling the torpedo 10 in FIG. 1.

As is known, the guidance point 15 of a torpedo 10 with an acoustical homing device lies externally well forward of the torpedo and its control center 14. Consequently any control actions taken on the torpedo 10 in pitch or yaw produce a lineal displacement of the guidance point 15 that is greater than the actual pitch or yaw of the torpedo 10 due to the extended lever arm from the torpedo center point 14 to the guidance point 15. Moreover, by definition the guidance point 15 is proximate the target when the acoustic homing device takes control.

If the guidance command $\Delta C$ from the defuzzification unit 35 continues to control the torpedo 10 directly, instabilities can arise in the command signal. To overcome this, the control system 16 shown in FIG. 2 includes a conditioning unit 36 that modifies the $\Delta C$ guidance command from the defuzzification unit 35 to produce a conditioned guidance command, $\Delta C_0$, for transfer to the communications link 23. In one particular embodiment the conditioning unit 36 includes an adjustable gain circuit 67 that modifies the gain in accordance with any of a variety of different influences. In one embodiment, for example, the position of the torpedo 10 relative to the target 12 is used to reduce the gain as the torpedo 10 approaches the target 12. More specifically, the trajectory model 21 generates an $R_{GD}$ signal that represents the distance from the guidance point 15 to the target 12. A parameter selection circuit 68 produces a GD signal that represents the distance from the center 14 of the torpedo 10 to the guidance point 15. The conditioning unit 36 applies a gain factor K to the guidance command, $\Delta C$ from the defuzzification unit such that $$\Delta C_0 = K \Delta C \qquad (31)$$

wherein $$K = 0.133 \left( \frac{R_{GD}}{GD} \right) \left( \frac{R_{GD}}{GD} + 1 \right). \qquad (32)$$

Thus it will be apparent that as the $R_{GD}$ distance between the guidance point 15 and that target 10 decreases, the gain factor applied to the guidance command also decreases. More gain can be applied to the guidance command for torpedo 10 with shorter lever arms between the center 14 and guidance point 15. Applying the gain factor based upon the $R_{GD}$ signal has the effect of continually reducing the conditioned guidance command $\Delta C_0$ as the torpedo 10 approaches the target thereby to enable the guidance point 15 of the torpedo 10 to move smoothly to the intercept point.

Figure 8:
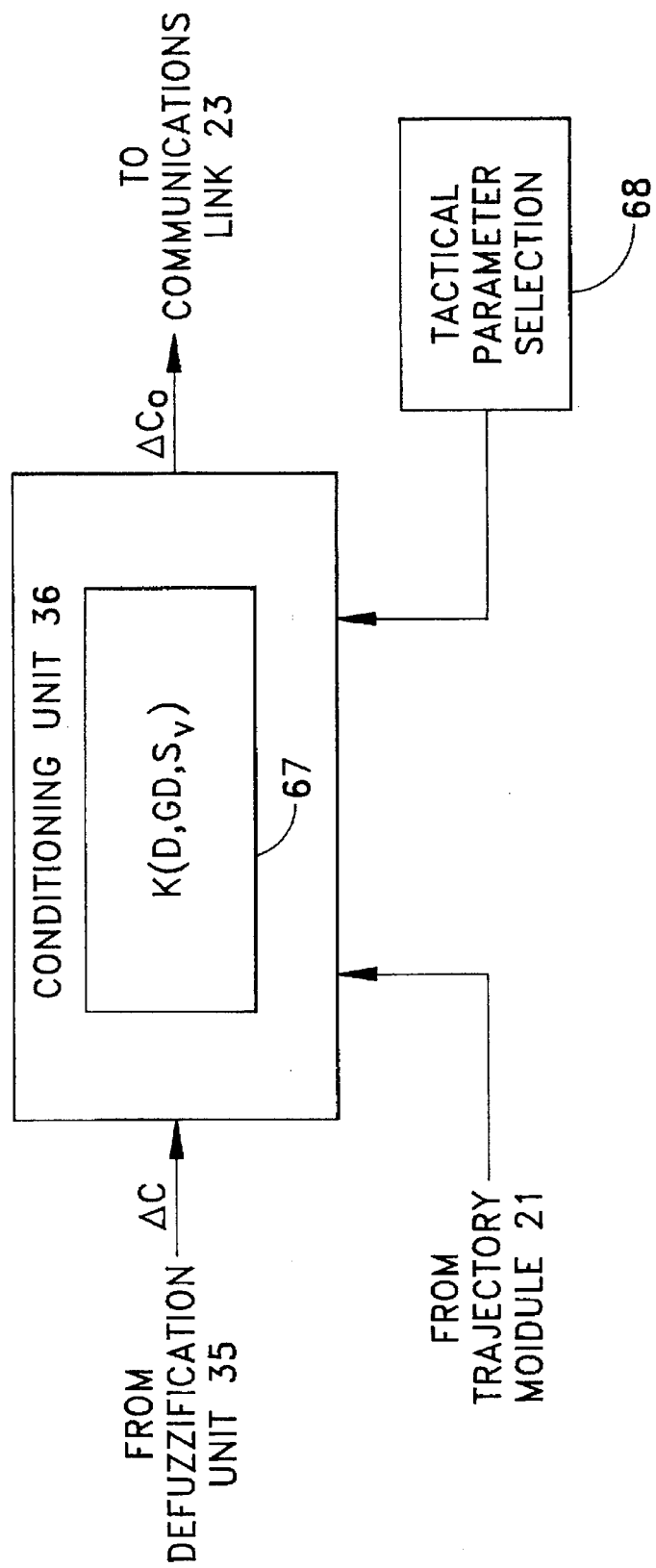
FIG. 8 depicts a command conditioning unit in accordance with this invention.

FIG. 8 also discloses a tactical parameter selection circuit 68 that provides inputs to the conditioning unit 36 such as the GD signal. This circuit allows other factors (e.g., $S_v$) as might be dictated by a particular set of circumstances or tactical situation, to be used as an input to the adjustable gain circuit 67. The conditioning unit 36 can respond to any of these criteria, but typically will depend on the relative positions of the target at the second site and the torpedo 10 as the steerable object for controlling the gain or conditioning of the guidance command $\Delta C$.

The communications link 23 transfers the command signal over the communications channel 24 to the communications link 25 in step 66 of FIG. 3B. The torpedo guidance system 26 responds to any command requiring a course alteration by changing the path of the torpedo 10 so as to maintain a target intercept trajectory.

Figure 9A:
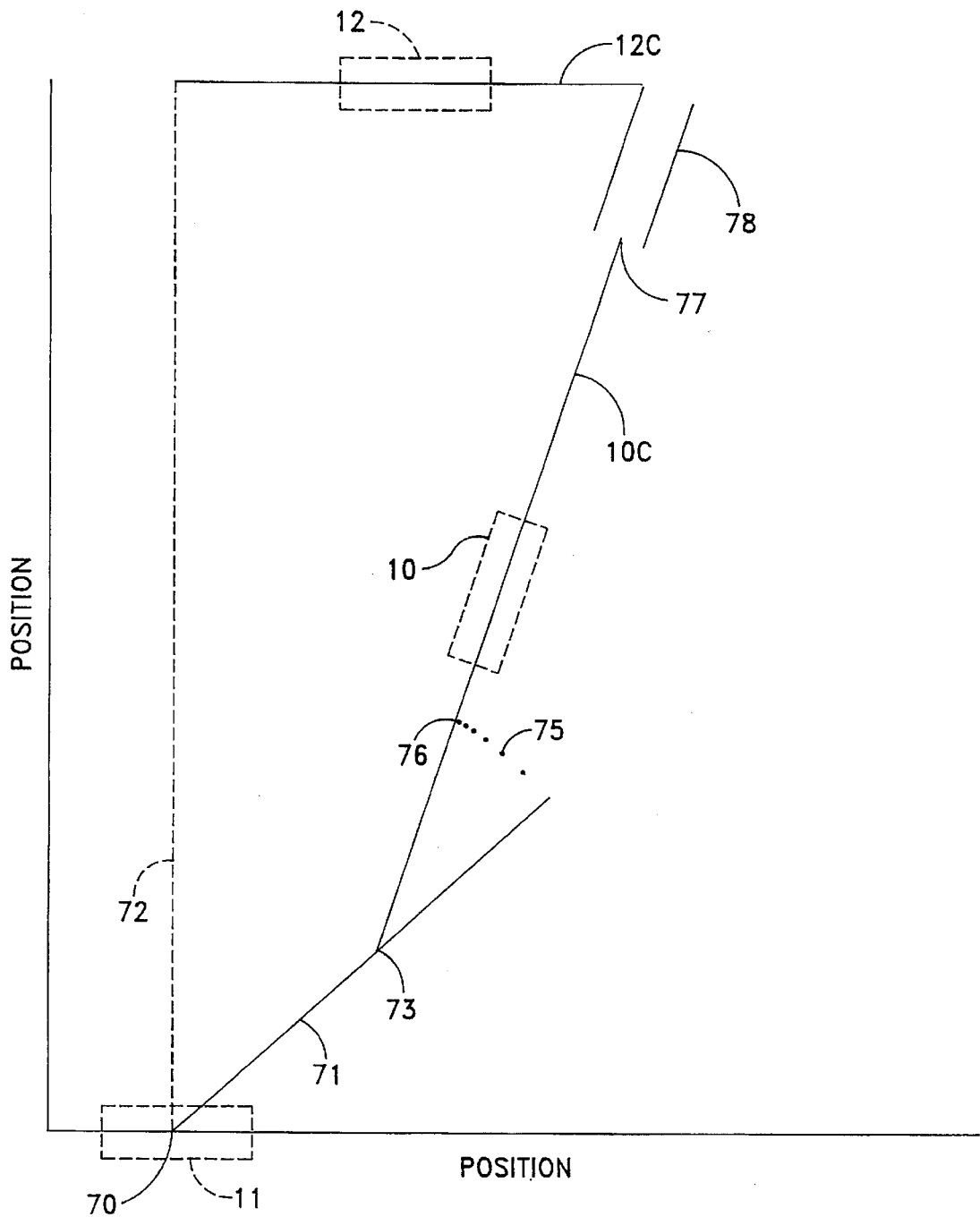

The effect of adding the conditioning unit shown in FIG. 8 can be appreciated by comparing FIGS. 9A, 9B and 9C and FIGS. 10A, 10B and 10C. FIGS. 9A through 9C depict the position, $e_{gp}$ and $\Delta e_{gp}$, signals as the torpedo 10 moves from a launcher 11 to a target 12 that does not maneuver along a target course 12C. It is assumed in this example that the launcher 11 is stationary, that target tracking commences at a position 70 and that the torpedo 10 is launched along a track 71 essentially at 45° to an initial bearing line 72. In accordance with accepted procedures, the torpedo 10 initially advances along the track 71 independently of the control system in FIG. 2 until the guidance system 16 eventually takes control at a position 73. When the guidance system 16 does take control, it steers the torpedo 10 to move the guidance point 15 through a series of positions 75 until the guidance point 15 is on the calculated intercept track represented by line 10C.

As will be apparent, from viewing FIGS. 9B and 9C and FIGS. 10B and 10C, the control functions are the same whether or not the conditioning unit 36 is utilized. In essence when the torpedo 10 maneuvers to put the guidance point 15 on the intercept trajectory and the course of the torpedo stabilizes, the error signal reaches a steady state value as shown by the graph segments 75 that depicts the change from the point at which the control system takes control at point 73 until the stable condition is reached at point 76.

As the torpedo 10 approaches the target 12, the guidance point 15 reaches a position at which the relative bearing between the course of the torpedo through the guidance point from that to the target can change thereby producing, as shown in FIGS. 9B and 9C, a shift in a slightly negative direction will produce a slight increase in the angle at point 77 which produces a control action. That action, given the lever arm from the point 14 of the torpedo 10 to the guidance point 15 begins to produce an increasing range of excursions in both the $e_{gp}$ and $\Delta e_{gp}$ signals causing an oscillatory motion through a portion of travel represented in each of FIGS. 9A through 9C by reference numeral 78, FIG. 9A depicting the successive positions of the guidance point as the torpedo approaches the target. This action can neutralize the ability of the acoustic homing device to make contact with the target 12.

Figure 10A:
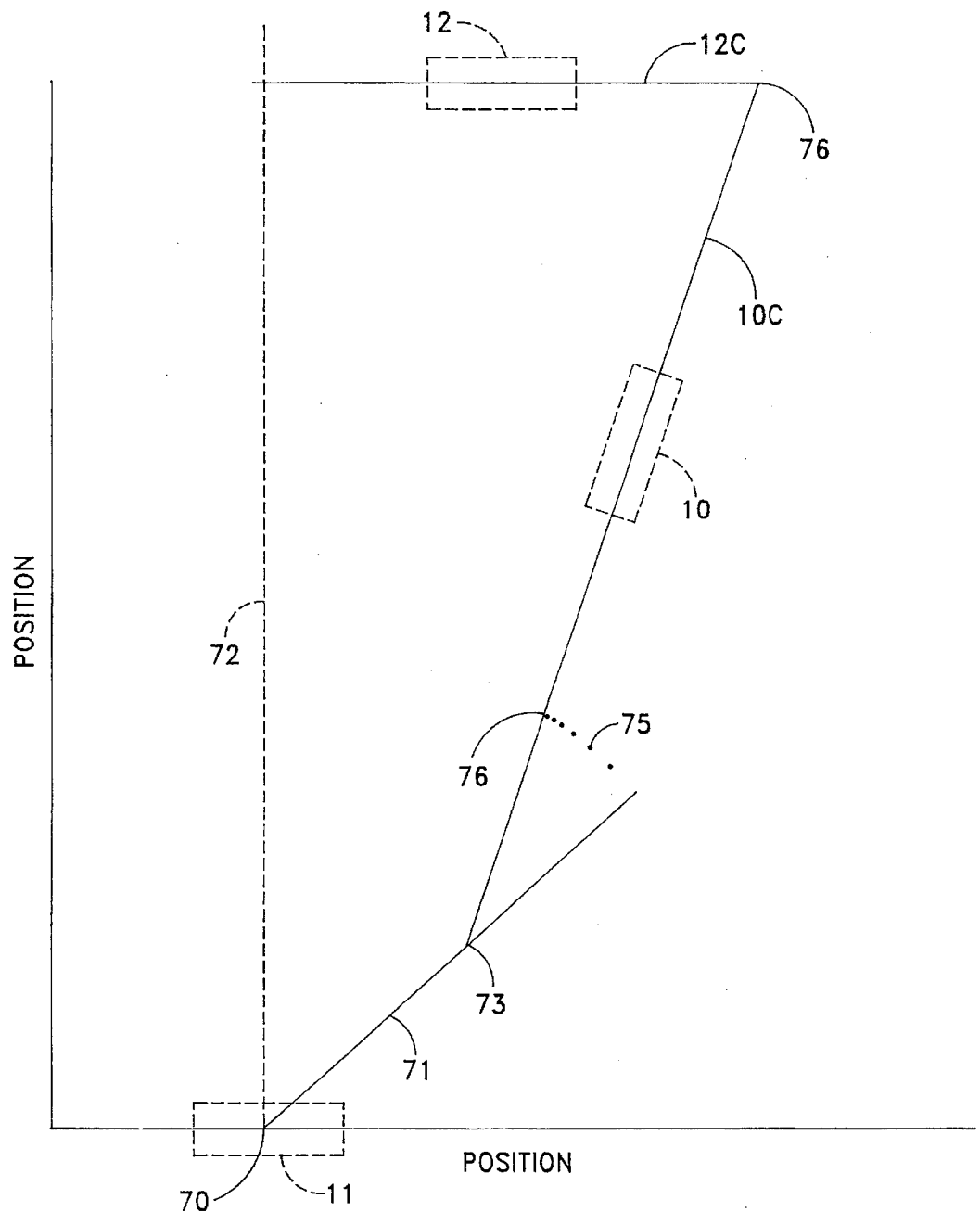
FIGS. 10A, 10B and 10C depict the operation of the guidance system shown in FIG. 2 when a target does not maneuver but includes the operation of the conditioning unit of FIG. 8.
Figure 10B:
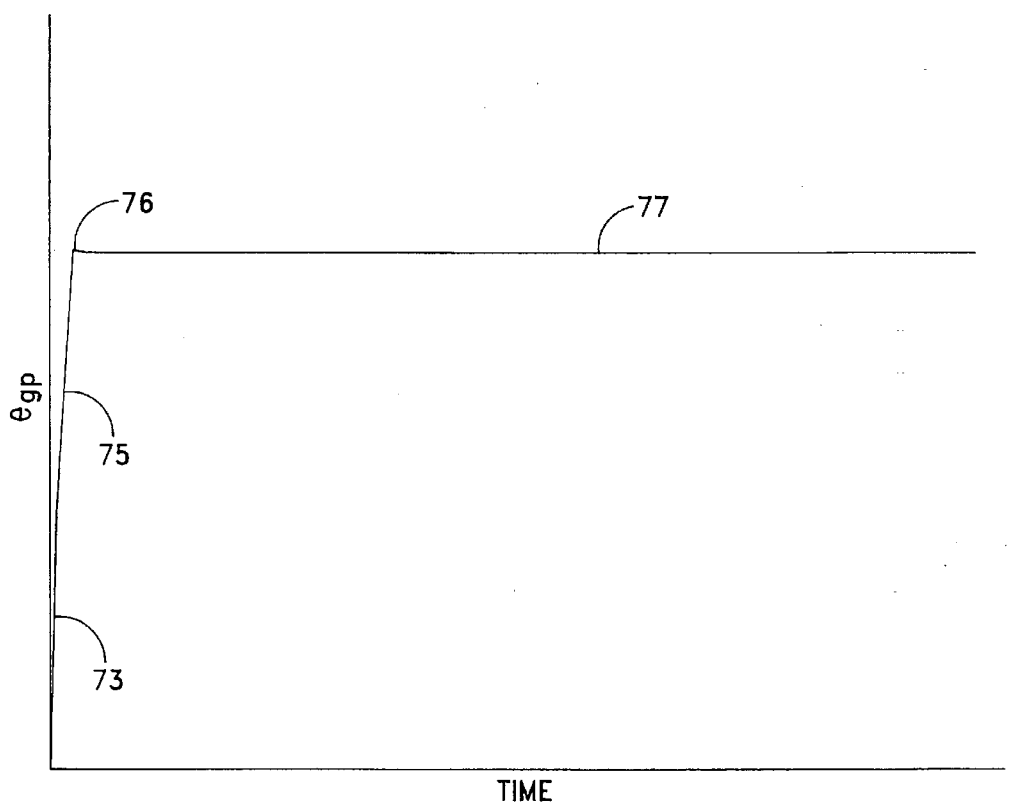
Figure 10C:
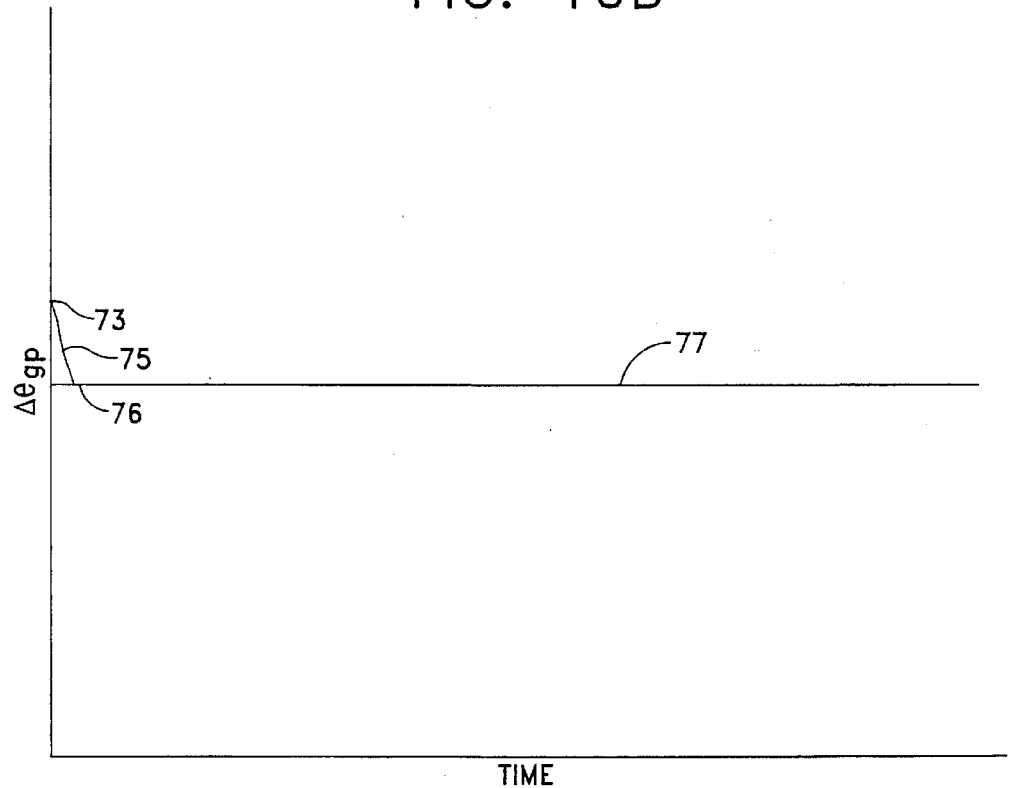

FIGS. 10A through 10C, however, show that with the conditioning unit 36 according to the specific embodiment described with reference to FIG. 8 reducing the gain on the guidance command, the torpedo 10 continues on the intercept trajectory 10C without producing any shift in the position of the guidance point 15 and hence no shifts beyond the reference point 77 in FIGS. 10B and 10C in which the oscillations of those signals began.

Figure 11A:
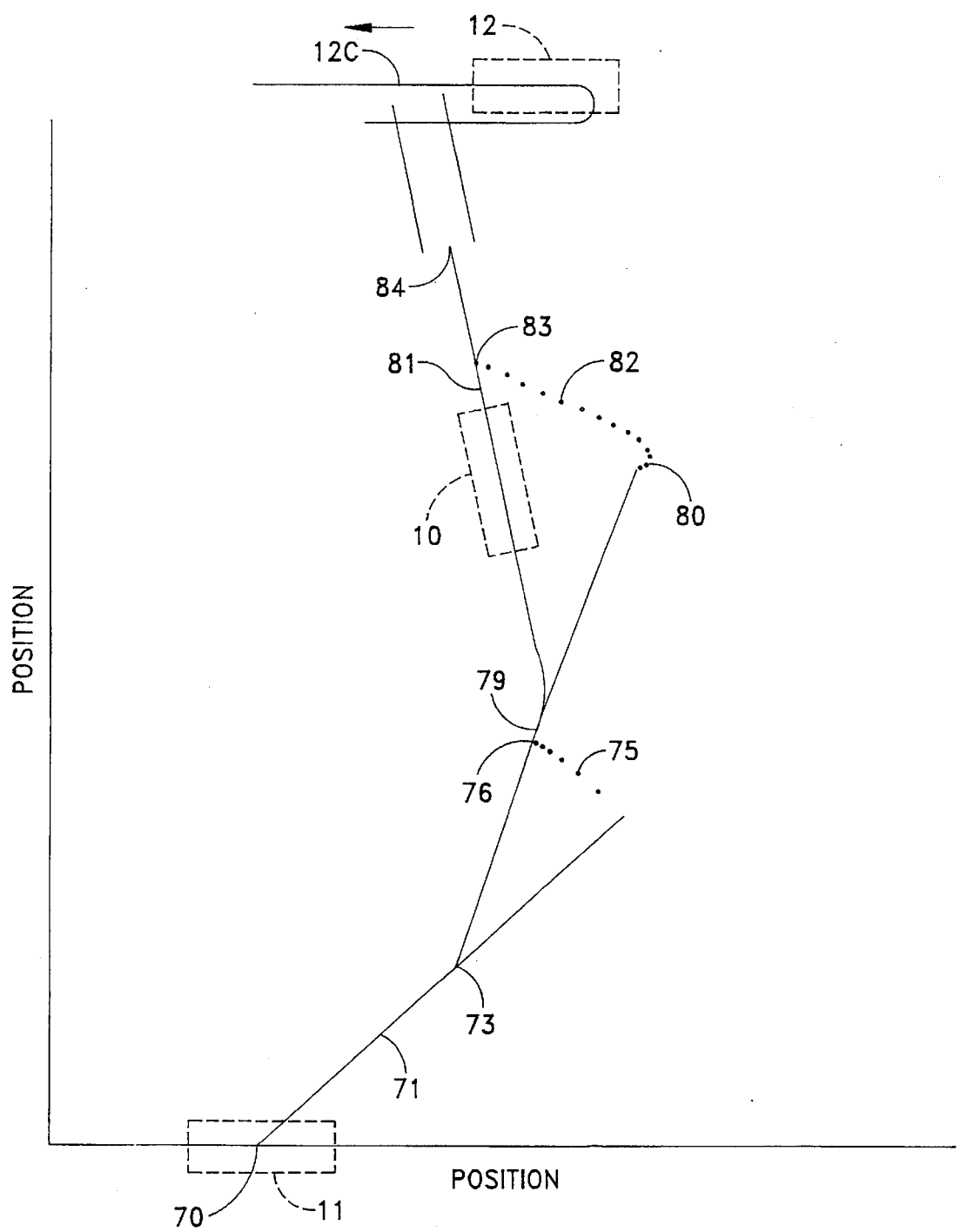
FIGS. 11A, 11B and 11C depict the operation of the guidance system shown in FIG. 2 absent the command conditioning unit of FIG. 8 when a target maneuvers.
Figure 12A:
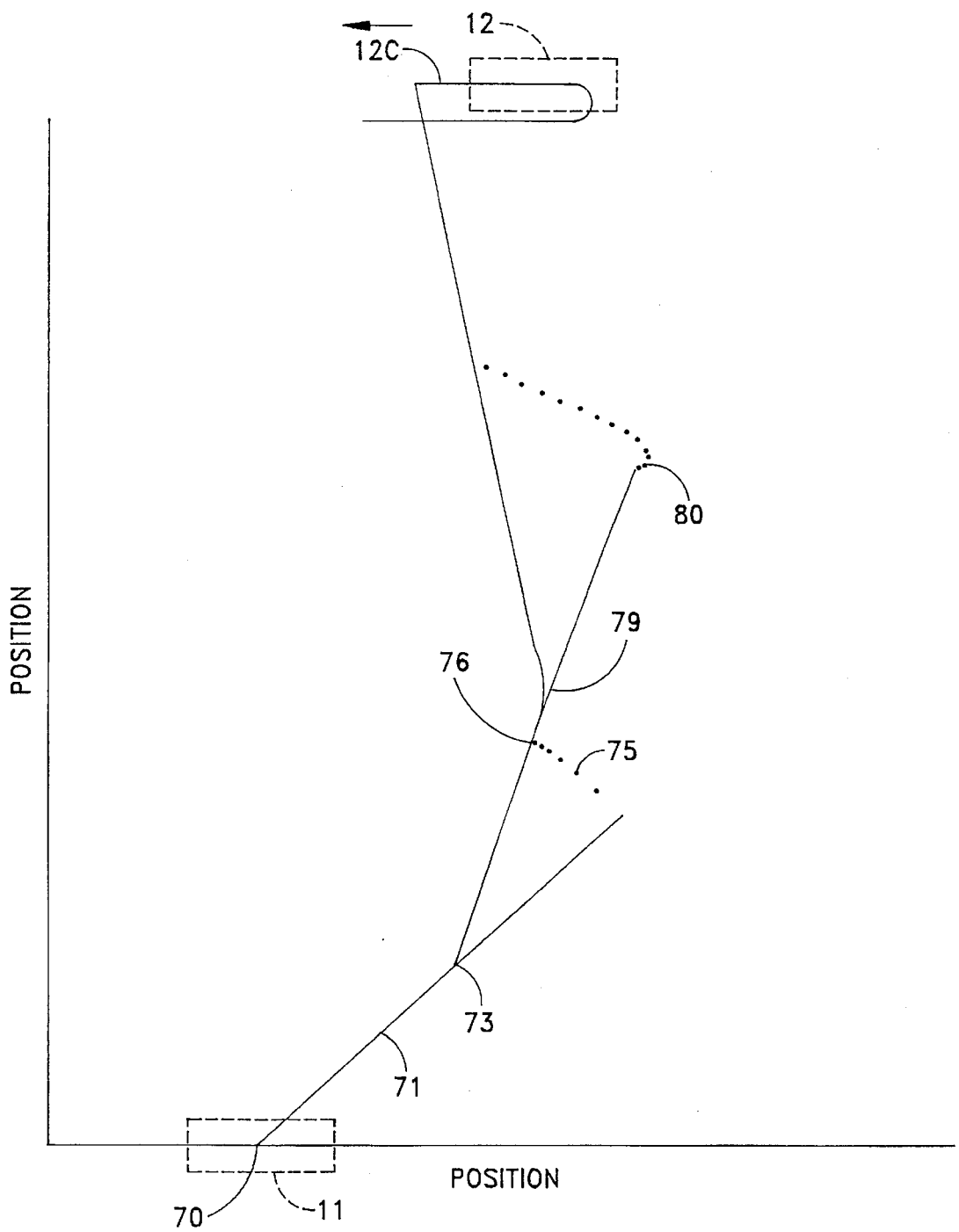
FIGS. 12A, 12B and 12C depict the operation of the guidance system shown in FIG. 2 when the target undergoes the maneuver in FIG. 11A and when the command conditioning unit of FIG. 8 operates.

FIGS. 11A and 12A depict a target 12 that initially moves along a straight line from the left to the right. During this time as in FIGS. 9A through 10C, in this system the torpedo 10 launches at a point 70 along a line 71 and the guidance system 16 in FIG. 2 takes control of the system at point 73 moving the guidance point through a range of positions 75 until it lies on an initial intercept course at a point 76.

When the torpedo 10 reaches a position 79 and the guidance point is at a position 80 in FIGS. 11A and 12A, the target 12 maneuvers through a 180° turn thereby to begin moving from right to left. As this maneuver occurs, the control system 16 again reorients the torpedo 10 onto a new course line 81 by moving the guidance point 15 through a range of positions 82 placing the guidance point 15 on the new intercept trajectory line 81 at point 83. Both the systems with and without the conditioning unit 36 tend to operate in substantially the same although a comparison of the changes in the $e_{gp}$ and $\Delta e_{gp}$ signals in FIGS. 11b and 11C show some noisy behavior during this transition.

Figure 11B:
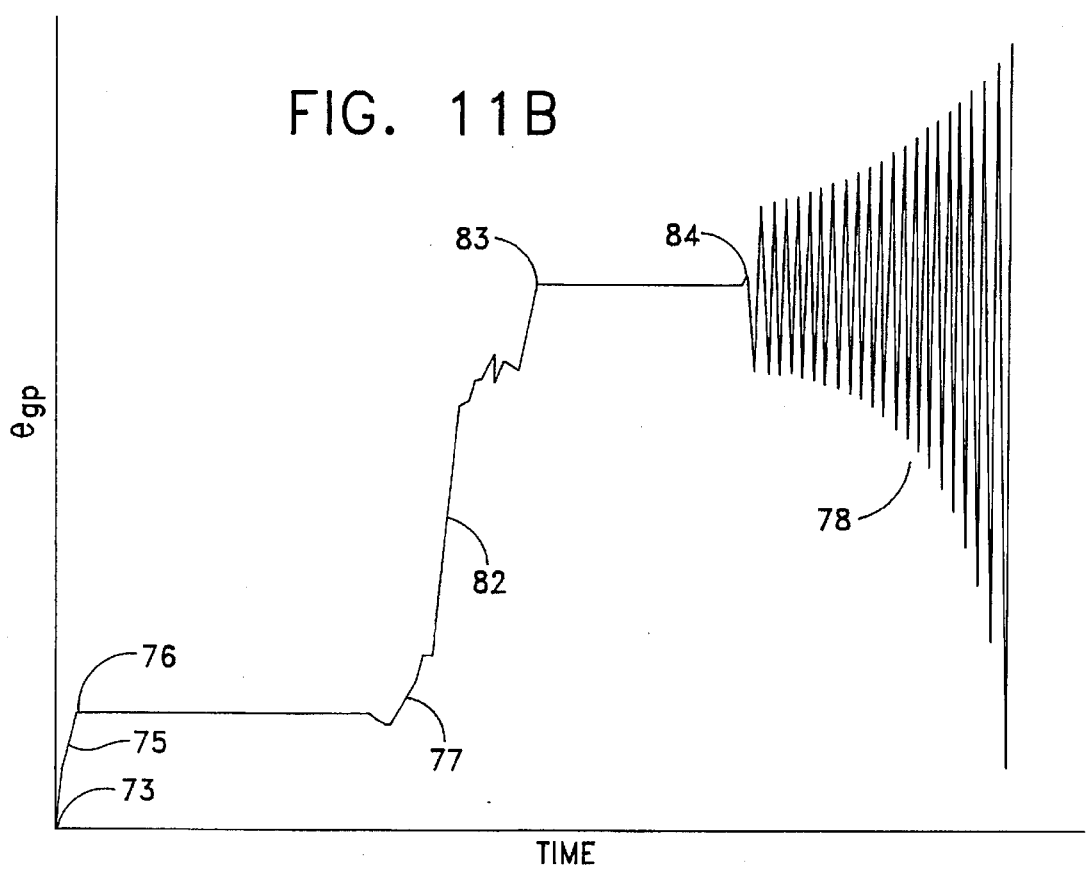
Figure 11C:
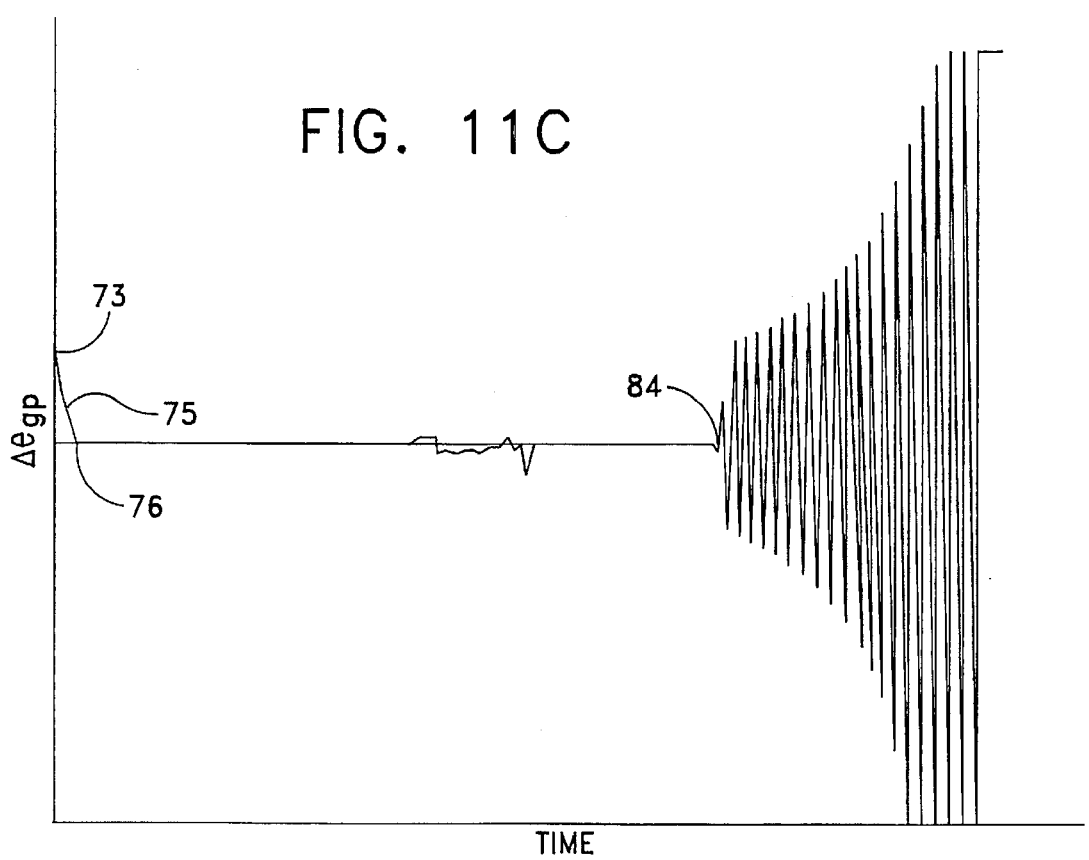
Figure 12B:
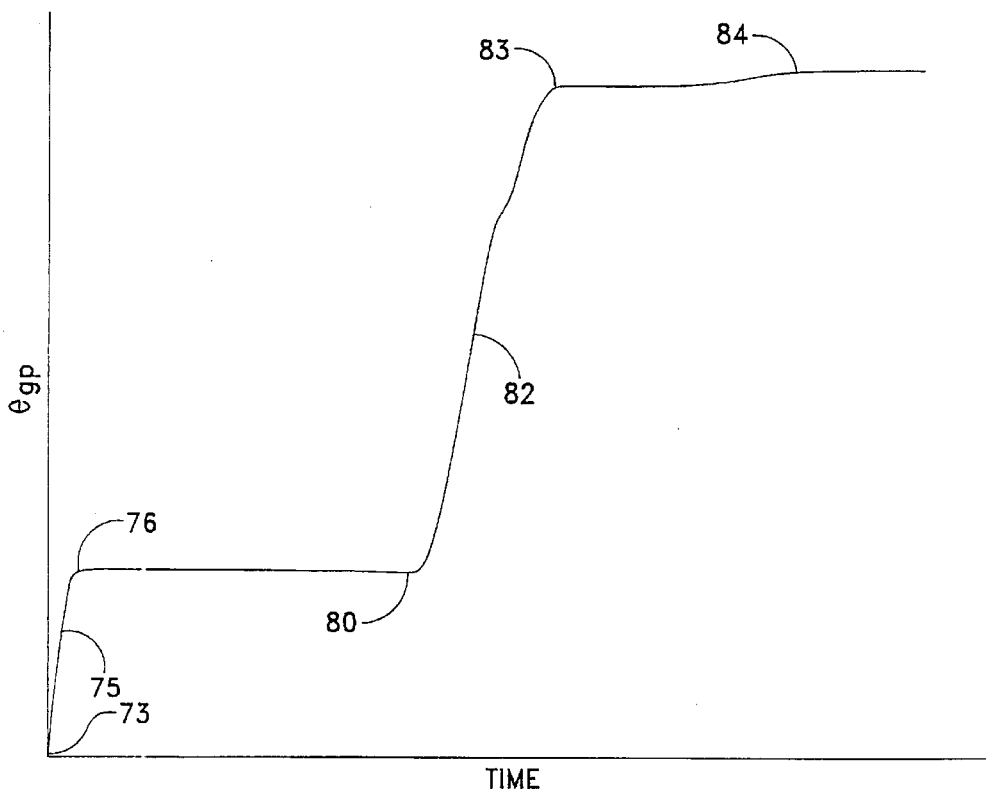
Figure 12C:
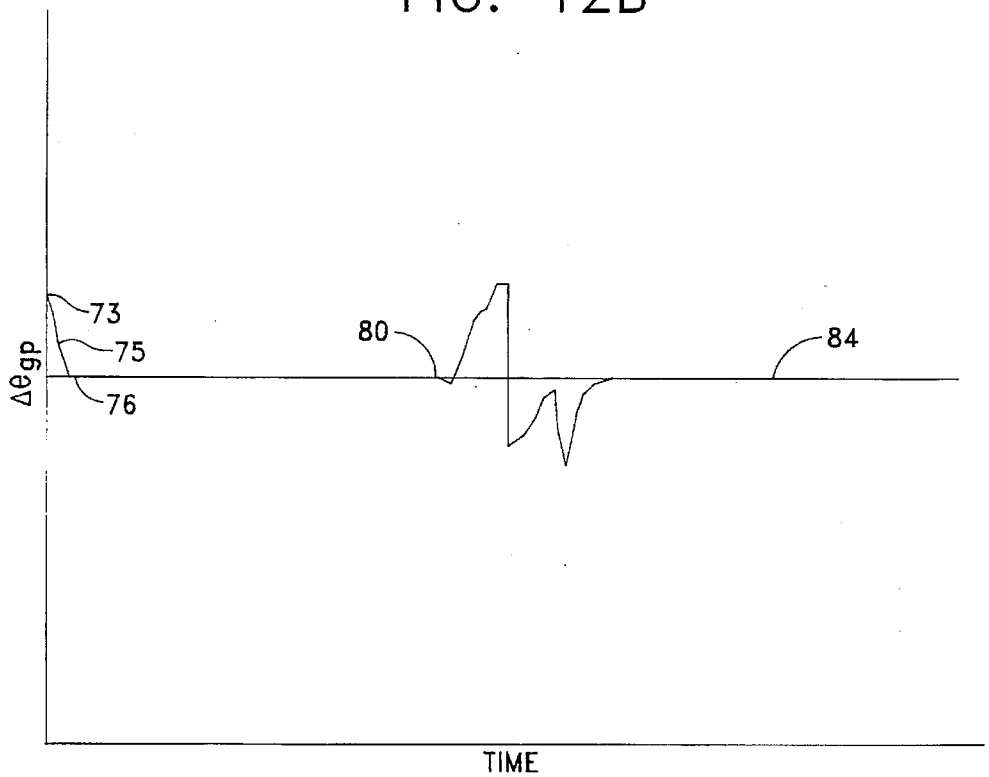

As previously indicated, with respect to FIGS. 9 and 10, however, when the torpedo reaches a point 84 the same instability as shown in FIGS. 9A through 9C appears in FIGS. 11A through 11C without the conditioning unit 36 whereas with the conditioning unit 36 as shown in FIGS. 12A through 12C there is no instability.

Thus in accordance with this invention, a guidance system 16 as shown in FIG. 2 combines the range and bearing to a contact or target and information about the operation of a torpedo including its guidance point to determine an angle between the bearing from the guidance point of the torpedo to the target and the course of the torpedo. These signals are sampled on a regular iterative basis, so data from two successive sets of signals also provides the rate of change of that angle. The fuzzification unit 33 uses corresponding sensed variable membership functions to encode each of the inputs obtained during one iteration into one or more sensed linguistic variables. A rule-based unit 34 converts these selected sensed linguistic variables into one or more control output linguistic variables that correspond to control output membership functions of a control output membership function set that then can be combined by diverse procedures to obtain a guidance command that is further modified in accordance with the current situation to provide a control signal for transfer to the torpedo such that the guidance point follows an intercept trajectory to the target.

As is apparent, this control system 22 emulates operations that reflect heuristic considerations through the utilization of a rule-based expert system that is contained in the matrix of FIG. 6 and that operates with linguistic variables. This system includes knowledge based upon specific experimental data and the experience of individuals.

This invention has been described in terms of block diagrams, processes and graphical analysis that will enable anyone of ordinary skill in control systems art to construct a specific embodiment of such a control system. It will be apparent that many modifications can be made to the disclosed apparatus without departing from the invention. Therefore, it is the intent of the appended claims to cover all such variations and modifications as come within the true spirit and scope of this invention.

What is claimed is:

1. A system for guiding a steerable object from a first site toward a second site wherein the steerable object includes an acoustic homing device characterized by a center point and by defining a guidance point externally to the steerable object and leading the steerable object as it moves toward the second site, said system comprising:

sensing means for generating bearing and range signals representing the bearing and range from the first site to the second site;

model means for generating signals representing the bearing from the guidance point of the steerable object to the second site and course, speed and position of the steerable object;

error signal generating means response to the signals from said sensing means and said model means for generating a first sensed variable signal based upon the bearing from the guidance point of the steerable object to the second site and the course of the steerable object and a second sensed variable signal based upon the rate of change of the first sensed variable signal;

fuzzy control means responsive to said first and second sensed variable signals for generating a guidance command for controlling the steerable object in response to a plurality of logical rules;

conditioning means for conditioning the guidance command in response to a selected one of said signals generated by the model means; and means for transferring the conditioned guidance command to the steerable object.

2. A guidance system as recited in claim 1 wherein said conditioning means includes means for adjusting the gain of the guidance command.

3. A guidance system as recited in claim 2 wherein said error signal generating means determines the bearing from the guidance point of the steerable object to the second site, $B_{cgp}$, and the course of the steerable object, $C_v$, and generates as the first sensed variable signal a signal $e_{gp}$ representing an error given by:

$$e_{gp} = B_{cgp} - C_v$$

and generates as the second sensed variable signal, a signal $\Delta e_{gp}$ representing the rate of change of the bearing error given by $$\Delta e_{gp} = |B_{cgp} - C_v|_k |B_{cgp(k-1)} - C_{v(k)}|$$

wherein the values "k" and "k−1" represent values taken during successive measurements by said sensing means and model means over a known time.

4. A guidance system as recited in claim 3 wherein said conditioning unit receives the positions of the guidance point of the steerable object and the second site and said gain adjusting means reduces the gain applied to the guidance command as the steerable object approaches the second site.

5. A guidance system as recited in claim 3 additionally comprising means for generating an $R_{GD}$ signal representing the distance from the guidance point to the second site and a GD signal representing the distance between the center point and the guidance point of the steerable object, said gain adjusting means applying to the guidance command a gain k given by:

$$K = 0.133 \left( \frac{R_{GD}}{GD} \right) \left( \frac{R_{GD}}{GD} + 1 \right).$$

6. An iterative method for guiding a steerable object from a first site to a second site wherein the steerable object includes an acoustic homing device characterized by a center point and by a guidance point externally to the steerable object and leading the steerable object as it moves toward the second site, said method comprising, during each iteration, the steps of:
- determining parameters corresponding to the range and bearing from the first site to the second site and corresponding to the bearing from the guidance point of the steerable object to the second site and to the course, speed and position of the steerable object;
- generating a first sensed variable signal based upon the bearing from the guidance point of the steerable object to the second site and the course of the steerable object and a second sensed variable signal representing the rate of change of the first sensed variable signal;
- generating in a fuzzy controller a guidance command for controlling the steerable object according to a plurality of logical rules in response to the first and second sensed variable signals;
- conditioning the guidance command in response to a selected one of said parameters; and
- transferring the conditioned guidance command from the fuzzy controller to the steerable object.

7. A method as recited in claim 6 wherein said conditioning includes adjusting the gain of the guidance command.

8. A method as recited in claim 7 wherein the generation of the sensed variable signals includes the steps of determining the bearing from the guidance point of the steerable object to the second site, $B_{cgp}$, and the course of the steerable object, $C_v$, and generating as the first sensed variable signal a signal, $e_{gp}$, representing an error given by:

$$e_{gp} = B_{cgp} - C_v$$

and generating as the second sensed variable signal, a signal, $\Delta e_{gp}$, representing the rate of change of the error given by:

$$\Delta e_{gp} = |B_{cgp} - C_v|_k - |B_{cgp(k-1)} - C_{v(k)}|$$

wherein the values "k" and "k–1" represent values taken during successive iterations.

9. A method as recited in claim 8 additionally including the selection of parameters and adjusting the gain in response to the selected parameters.

10. A method as recited in claim 8 wherein the gain applied to the guidance command is reduced as the steerable object approaches the second site.

11. A method as recited in claim 8 additionally comprising the steps of generating an $R_{GD}$ signal representing the distance from the guidance point to the second site and a GD signal representing the distance between the center point and the guidance point of the steerable object and applying to the guidance command a gain, K, given by:

$$K = 0.133 \left( \frac{R_{GD}}{GD} \right) \left( \frac{R_{GD}}{GD} + 1 \right).$$

* * * * *